United States Patent
Galloway et al.

(10) Patent No.: US 8,527,699 B2
(45) Date of Patent: Sep. 3, 2013

(54) METHOD AND SYSTEM FOR DISTRIBUTED RAID IMPLEMENTATION

(75) Inventors: William C. Galloway, Magnolia, TX (US); Choon-Seng Tan, Houston, TX (US); Benjamin Wayne Goodwyn, Tomball, TX (US); Matthew E. Curley, Cypress, TX (US)

(73) Assignee: Pivot3, Inc., Spring, TX (US)

( * ) Notice: Subject to any disclaimer, the term of this patent is extended or adjusted under 35 U.S.C. 154(b) by 167 days.

(21) Appl. No.: 13/093,042

(22) Filed: Apr. 25, 2011

(65) Prior Publication Data
US 2012/0271997 A1 Oct. 25, 2012

(51) Int. Cl.
*G06F 12/00* (2006.01)
*G06F 13/00* (2006.01)
*G06F 13/28* (2006.01)

(52) U.S. Cl.
USPC ........... 711/114; 711/100; 711/111; 711/154; 711/169

(58) Field of Classification Search
None
See application file for complete search history.

(56) References Cited

U.S. PATENT DOCUMENTS

| | | | |
|---|---|---|---|
| 5,568,629 A | 10/1996 | Gentry et al. | |
| 6,304,942 B1 | 10/2001 | DeKoning et al. | |
| 6,370,605 B1 | 4/2002 | Chong, Jr. | |
| 6,601,138 B2 * | 7/2003 | Otterness et al. | 711/114 |
| 6,895,485 B1 | 5/2005 | DeKoning et al. | |
| 7,032,086 B2 | 4/2006 | Merchant | |
| 7,096,316 B1 | 8/2006 | Karr et al. | |
| 7,130,960 B1 | 10/2006 | Kano | |
| 7,366,837 B2 | 4/2008 | Corbett et al. | |
| 7,389,393 B1 | 6/2008 | Karr et al. | |
| 7,412,573 B2 * | 8/2008 | Uratani et al. | 711/154 |
| 7,546,398 B2 | 6/2009 | Corneli et al. | |
| 8,082,393 B2 | 12/2011 | Galloway | |
| 8,086,797 B2 | 12/2011 | Galloway | |
| 8,090,909 B2 | 1/2012 | Galloway | |
| 8,127,076 B2 | 2/2012 | Galloway | |
| 8,140,753 B2 | 3/2012 | Galloway et al. | |
| 8,145,841 B2 | 3/2012 | Galloway | |
| 8,176,247 B2 | 5/2012 | Galloway et al. | |

(Continued)

FOREIGN PATENT DOCUMENTS

| CN | 1747385 | 3/1996 |
|---|---|---|
| JP | 5-257611 | 10/1993 |

(Continued)

OTHER PUBLICATIONS

Office Action issued for U.S. Appl. No. 12/479,319 mailed Jun. 22, 2011, 18 pgs.

(Continued)

*Primary Examiner* — Sanjiv Shah
*Assistant Examiner* — Mohamed Gebril
(74) *Attorney, Agent, or Firm* — Sprinkle IP Law Group

(57) ABSTRACT

Embodiments of the systems and methods disclosed provide a distributed RAID system comprising a set of data banks. More particularly, in certain embodiments of a distributed RAID system each data bank has a set of associated storage media and executes a similar distributed RAID application. Each data bank may have a high speed memory where a write cache is stored. In certain embodiments, a virtualization layer may be executed on a data bank and the distributed RAID application may execute on the virtualization layer. The distributed RAID application may control access to the high speed memory on which the write cache is stored.

21 Claims, 16 Drawing Sheets

(56) References Cited

U.S. PATENT DOCUMENTS

| | | | |
|---|---|---|---|
| 8,219,750 | B2 | 7/2012 | Galloway et al. |
| 8,239,624 | B2 | 8/2012 | Galloway et al. |
| 8,255,625 | B2 | 8/2012 | Galloway et al. |
| 8,261,017 | B2 | 9/2012 | Galloway et al. |
| 8,271,727 | B2 | 9/2012 | Galloway et al. |
| 8,316,180 | B2 | 11/2012 | Galloway et al. |
| 8,316,181 | B2 | 11/2012 | Galloway et al. |
| 8,386,709 | B2 | 2/2013 | Galloway et al. |
| 8,417,888 | B2 | 4/2013 | Galloway et al. |
| 2001/0044879 | A1 | 11/2001 | Moulton et al. |
| 2002/0035667 | A1 | 3/2002 | Brunning, III et al. |
| 2002/0069317 | A1 | 6/2002 | Chow et al. |
| 2002/0069318 | A1 | 6/2002 | Chow et al. |
| 2002/0087751 | A1 | 7/2002 | Chong, Jr. |
| 2003/0135709 | A1 | 7/2003 | Niles et al. |
| 2003/0159001 | A1 | 8/2003 | Chalmer et al. |
| 2004/0003173 | A1 | 1/2004 | Yao et al. |
| 2004/0153479 | A1 | 8/2004 | Mikesell et al. |
| 2004/0168018 | A1 | 8/2004 | Aashiem et al. |
| 2004/0177218 | A1 | 9/2004 | Meehan et al. |
| 2004/0221070 | A1 | 11/2004 | Ortega, III et al. |
| 2005/0015700 | A1 | 1/2005 | Hetzler et al. |
| 2005/0050383 | A1 | 3/2005 | Horn et al. |
| 2005/0114350 | A1 | 5/2005 | Rose et al. |
| 2006/0010227 | A1 | 1/2006 | Atluri |
| 2006/0129559 | A1 | 6/2006 | Sankaran et al. |
| 2006/0242377 | A1 | 10/2006 | Kanie et al. |
| 2006/0248273 | A1 | 11/2006 | Jernigan, IV et al. |
| 2006/0248379 | A1 | 11/2006 | Jernigan, IV |
| 2006/0271734 | A1 | 11/2006 | Strange et al. |
| 2006/0277383 | A1 | 12/2006 | Hayden et al. |
| 2007/0028044 | A1 | 2/2007 | Hetrick et al. |
| 2007/0073990 | A1 | 3/2007 | Snaman et al. |
| 2007/0094348 | A1 | 4/2007 | Scheidel et al. |
| 2007/0143541 | A1 | 6/2007 | Nichols et al. |
| 2007/0271434 | A1 | 11/2007 | Kawamura et al. |
| 2008/0104443 | A1 | 5/2008 | Akutsu et al. |
| 2008/0109601 | A1 | 5/2008 | Klemm et al. |
| 2008/0155191 | A1 | 6/2008 | Anderson et al. |
| 2008/0222633 | A1 | 9/2008 | Kami |
| 2008/0256292 | A1 | 10/2008 | Flynn et al. |
| 2008/0270680 | A1 | 10/2008 | Chang |
| 2009/0006746 | A1 | 1/2009 | Sharma et al. |
| 2009/0172335 | A1 | 7/2009 | Kulkarni et al. |
| 2010/0106906 | A1 | 4/2010 | Galloway et al. |
| 2011/0022801 | A1 | 1/2011 | Flynn |
| 2012/0054431 | A1 | 3/2012 | Galloway et al. |
| 2012/0054432 | A1 | 3/2012 | Galloway et al. |
| 2012/0054433 | A1 | 3/2012 | Galloway et al. |
| 2012/0059978 | A1* | 3/2012 | Rosenband et al. .......... 711/103 |
| 2012/0124286 | A1 | 5/2012 | Galloway et al. |
| 2012/0131383 | A1 | 5/2012 | Galloway et al. |
| 2012/0137069 | A1 | 5/2012 | Galloway et al. |
| 2012/0271998 | A1 | 10/2012 | Galloway et al. |
| 2012/0297136 | A1 | 11/2012 | Galloway et al. |
| 2012/0297137 | A1 | 11/2012 | Galloway et al. |

FOREIGN PATENT DOCUMENTS

| | | |
|---|---|---|
| JP | 5-324579 | 12/1993 |
| JP | 5-334006 | 12/1993 |
| JP | 7-261945 | 10/1995 |
| JP | 2000-76207 | 3/2000 |
| JP | 2006-331076 | 12/2006 |
| JP | 2008-41093 | 2/2008 |
| JP | 2008-107896 | 5/2008 |

OTHER PUBLICATIONS

Office Action issued for U.S. Appl. No. 12/479,403, mailed Jun. 24, 2011, 13 pgs.
Notice of Allowance issued for U.S. Appl. No. 12/479,360, mailed Apr. 2, 2012, 4 pages.
Office Action issued for U.S. Appl. No. 13/358,306, mailed Apr. 4, 2012, 21 pages.
Supplemental Notice of Allowance issued for U.S. Appl. No. 13/291,309, mailed May 22, 2012, 5 pages.
Corrected Notice of Allowance issued for U.S. Appl. No. 13/291,311, mailed May 22, 2012, 5 pages.
Office Action issued for U.S. Appl. No. 13/364,439, mailed May 25, 2012, 21 pages.
Notice of Allowance for U.S. Appl. No. 12/490,916, mailed Jan. 9, 2012, 5 pgs.
Office Action issued for U.S. Appl. No. 13/291,311 mailed Feb. 1, 2012, 12 pages.
Office Action issued for U.S. Appl. No. 12/479,360 mailed Feb. 6, 2012, 8 pages.
Office Action issued in U.S. Appl. No. 13/292,388, mailed Jan. 20, 2012, 6 pages.
Notice of Allowance issued for U.S. Appl. No. 12/490,810, mailed Feb. 16, 2012, 8 pages.
Office Action issued for U.S. Appl. No. 13/291,309, mailed Feb. 24, 2012, 10 pages.
Office Action issued for U.S. Appl. No. 13/366,069, mailed Mar. 13, 2012, 9 pages.
Notice of Allowance issued for U.S. Appl. No. 13/366,069, mailed Jun. 8, 2012, 6 pages.
Corrected Notice of Allowance issued for U.S. Appl. No. 13/291,311, mailed Jun. 21, 2012, 5 pages.
Supplemental Notice of Allowance issued for U.S. Appl. No. 13/291,309, mailed Jun. 22, 2012, 5 pages.
Office Action issued for U.S. Appl. No. 12/914,559, mailed Jun. 25, 2012, 15 pages.
European Search Report issued for European Patent Application No. 09 759 544.1, mailed on Apr. 5, 2012, 12 pages.
Office Action issued for U.S. Appl. No. 12/479,377, mailed Jul. 29, 2011, 14 pgs.
Notice of Allowance issued for U.S. Appl. No. 13/224,936, mailed Dec. 14, 2011, 9 pgs.
Notice of Allowance issued for U.S. Appl. No. 13/358,306 mailed Aug. 24, 2012, 3 pages.
Notice of Allowance issued for U.S. Appl. No. 13/366,069 mailed Aug. 29, 2012, 4 pages.
International Search Report and Written Opinion issued for PCT Patent Application No. PCT/US2009/046470 mailed Jul. 21, 2009, 9 pgs.
International Search Report and Written Opinion issued for PCT Patent Application No. PCT/US2009/046473 mailed Jul. 14, 2009, 8 pgs.
International Search Report and Written Opinion issued for PCT Patent Application No. PCT/US2009/048570 mailed Aug. 5, 2009, 9 pgs.
International Search Report and Written Opinion issued for PCT Patent Application No. PCT/US2009/048574 mailed Aug. 20, 2009, 10 pgs.
International Search Report and Written Opinion issued for PCT Patent Application No. PCT/US2009/046471 mailed Dec. 28, 2009, 9 pgs.
International Preliminary Report on Patentability issued for PCT Patent Application No. PCT/US2009/046470, mailed Dec. 16, 2010, issued on Dec. 6, 2010, 8 pgs.
International Preliminary Report on Patentability issued for PCT Patent Application No. PCT/US2009/046471, mailed Dec. 16, 2010, issued on Dec. 6, 2010, 8 pgs.
International Preliminary Report on Patentability issued for PCT Patent Application No. PCT/US2009/046473, mailed Dec. 16, 2010, issued on Dec. 6, 2010, 7 pgs.
International Preliminary Report on Patentability issued for PCT Patent Application No. PCT/US2009/048570, mailed Jan. 13, 2011, issued on Jan. 5, 2011, 8 pgs.
Office Action issued for U.S. Appl. No. 12/479,434, mailed May 11, 2011, 13 pgs.
International Preliminary Report on Patentability for PCT Patent Application No. PCT/US2009/048574, mailed May 12, 2011, 9 pgs.
Office Action issued for U.S. Appl. No. 12/479,360, mailed Jun. 7, 2011, 17 pgs.
Office Action issued in U.S. Appl. No. 13/224,936, mailed Oct. 12, 2011, 8 pgs.

Office Action issued in U.S. Appl. No. 12/490,810, mailed Oct. 18, 2011, 21 pgs.
Office Action issued in U.S. Appl. No. 12/479,360, mailed Oct. 25, 2011, 25 pgs.
John H. Hartman et al., "The Zebra Striped Network File System," ACM Transactions on Computer Systems, vol. 13, No. 3, Aug. 1995, pp. 274-310.
Notice of Allowance issued for U.S. Appl. No. 12/479,377, mailed Nov. 18, 2011, 8 pgs.
Office Action and its English translation issued for Chinese Patent Application No. 200980125013.9, mailed Nov. 5, 2012, 20 pages.
Notice of Allowance issued in U.S. Appl. No. 12/479,434, mailed Sep. 21, 2011, 9 pgs.
Supplemental Notice of Allowance for U.S. Appl. No. 12/490,916, mailed Apr. 9, 2012, 4 pages.
Notice of Allowance issued for U.S. Appl. No. 13/291,309, mailed Apr. 12, 2012, 5 pages.
Notice of Allowance issued for U.S. Appl. No. 13/291,311, mailed Apr. 13, 2012, 5 pages.
Notice of Allowance issued for U.S. Appl. No. 12/914,559, mailed Oct. 16, 2012, 9 pages.
Notice of Allowance issued for U.S. Appl. No. 13/364,439, mailed Oct. 18, 2012, 6 pages.
Notice of Allowance issued in U.S. Appl. No. 12/479,403, mailed Sep. 30, 2011, 14 pgs.
Notice of Allowance issued in U.S. Appl. No. 12/479,319, mailed Oct. 5, 2011, 14 pgs.
Notice of Allowance issued in U.S. Appl. No. 12/479,394, mailed Oct. 5, 2011, 8 pgs.
Supplemental Notice of Allowance issued for U.S. Appl. No. 13/291,309, mailed Aug. 2, 2012, 5 pages.
Notice of Allowance issued for U.S. Appl. No. 13/543,561, mailed Apr. 1, 2013, 8 pages.
2nd Notice of Allowance issued for U.S. Appl. No. 13/543,561, mailed Apr. 22, 2013, 5 pages.
Notice of Allowance issued for U.S. Appl. No. 13/093,042, mailed Apr. 24, 2013, 9 pages.
2nd Notice of Allowance issued for U.S. Appl. No. 13/543,561, mailed Jun. 17, 2013, 2013, 5 pages.
Office Action issued for Japanese Patent Application No. 2011-512708, mailed May 10, 2013, 11 pages.
Office Action issued for Japanese Patent Application No. 2011-107699, mailed May 10, 2013, 6 pages.
Office Action issued for Japanese Patent Application No. 2011-516637, mailed May 10, 2013, 9 pages.
Kami, Nobuharu et al., "Multilayer-Cooperative, In-service Reconfiguration in IT/NW Systems", Proceedings of the 2007 IEICE General Conference, p. 66, Mar. 7, 2007.
Office Action issued for Japanese Patent Application No. 2011-36454, mailed May 10, 2013, 5 pages.
Office Action issued for U.S. Appl. No. 13/333,615, mailed Jun. 6, 2013, 16 pages.
Chinese Office Action issued for Chinese Patent Application No. 200980151742.1, mailed May 31, 2013, 10 pages.
Chinese Office Action issued for Chinese Patent Application No. 201110076346.6, mailed Jun. 3, 2013, 9 pages.

* cited by examiner

TABLE 550

| | | |
|---|---|---|
| 4 BYTES | LV NUMBER | 504 |
| 4 BYTES | SEGMENT SIZE | 508 |
| 8 BYTES | SEGMENT COUNT | 512 |
| 4 BYTES | QUALITY OF SERVICE | 514 |
| 4 BYTES | RANGE COUNT | 518 |
| 4 BYTES | TYPE | 526a |
| 8 BYTES | START | 530a |
| 8 BYTES | END | 534a |
| 2 BYTES | NETWORK RAID | 538a |
| 2 BYTES | NETWORK RAID SIZE | 542a |
| 2 BYTES | DISK RAID | 546a |
| 2 BYTES | DISK RAID SIZE | 552a |
| 4 BYTES | DATA BANK COUNT | 554a |
| 4 BYTES | DATA BANK ORDER | 558a |
| 4 BYTES | DISK COUNT | 562a |
| 4 BYTES | DISK ORDER | 566a |
| | ○○○ | |
| 4 BYTES | DISK COUNT | 562an |
| 4 BYTES | DISK ORDER | 566an |
| 4 BYTES | TYPE | 526b |
| 8 BYTES | START | 530b |
| 8 BYTES | END | 534b |
| 2 BYTES | NETWORK RAID | 538b |
| 2 BYTES | NETWORK RAID SIZE | 542b |
| 2 BYTES | DISK RAID | 546b |
| 2 BYTES | DISK RAID SIZE | 552b |
| 4 BYTES | DATA BANK COUNT | 554b |
| 4 BYTES | DATA BANK ORDER | 558b |
| 4 BYTES | DISK COUNT | 562b |
| 4 BYTES | DISK ORDER | 566b |
| | ○○○ | |
| 4 BYTES | DISK COUNT | 562bn |
| 4 BYTES | DISK ORDER | 566bn |
| ADDITIONAL RANGE ENTRIES | | 524n |

524a INFORMATION FOR RANGE

524b INFORMATION FOR RANGE

*FIG. 5*

| DISK TABLE 670 | | | |
|---|---|---|---|
| PHYSICAL SEGMENT 1 | LV NUMBER | LOGICAL SEGMENT NUMBER | ADDRESS SPACE | SECTOR STATE |
| PHYSICAL SEGMENT 2 | LV NUMBER | LOGICAL SEGMENT NUMBER | ADDRESS SPACE | SECTOR STATE |
| PHYSICAL SEGMENT 3 | LV NUMBER | LOGICAL SEGMENT NUMBER | ADDRESS SPACE | SECTOR STATE |
| PHYSICAL SEGMENT 4 | LV NUMBER | LOGICAL SEGMENT NUMBER | ADDRESS SPACE | SECTOR STATE |
| PHYSICAL SEGMENT 5 | LV NUMBER | LOGICAL SEGMENT NUMBER | ADDRESS SPACE | SECTOR STATE |
| PHYSICAL SEGMENT 6 | LV NUMBER | LOGICAL SEGMENT NUMBER | ADDRESS SPACE | SECTOR STATE |
| ... | ... | ... | ... | ... |
| PHYSICAL SEGMENT (n) | LV NUMBER | LOGICAL SEGMENT NUMBER | ADDRESS SPACE | SECTOR STATE |
| PHYSICAL SEGMENT (n+1) | LV NUMBER | LOGICAL SEGMENT NUMBER | ADDRESS SPACE | SECTOR STATE |

METHOD AND SYSTEM FOR DISTRIBUTED RAID IMPLEMENTATION

TECHNICAL FIELD

This disclosure relates generally to the use of storage devices. More particularly, this disclosure relates to implementing RAID on storage devices. Even more particularly, this disclosure relates to a distributed implementation of RAID. In addition, this disclosure relates to increasing the performance of implementations of RAID.

BACKGROUND

Data represents a significant asset for many entities. Consequently, data loss, whether accidental or caused by malicious activity, can be costly in terms of wasted manpower, loss of goodwill from customers, loss of time and potential legal liability. To ensure proper protection of data for business, legal or other purposes, many entities may desire to protect their data using a variety of techniques, including data storage, redundancy, security, etc. These techniques may, however, conflict with other competing constraints or demands imposed by the state or configuration of computing devices used to process or store this data.

One method for dealing with these tensions is to implement a Redundant Array of Independent Disks (RAID). Generally, RAID systems divide and replicate data across multiple hard disk drives (or other types of storage media), collectively referred to as an array, to increase reliability and in some cases improve throughput of computing devices (known as a host) using these RAID systems for storage. To a host then, a RAID array may appear as one or more monolithic storage areas. When a host desires to communicate (read, write, etc.) with the RAID system the host communicates as if the RAID array were a single disk. The RAID system, in turn, processes these communications to implement a certain RAID level in conjunction with such communications. These RAID levels may be designed to achieve some desired balance between a variety of tradeoffs such as reliability, capacity, speed, etc. For example, RAID (level) 0 distributes data across several disks in a way which gives improved speed and utilizes substantially the full capacity of the disks, but all data on a disk will be lost if the disk fails; RAID (level) 1 uses two (or more) disks which each store the same data, so that data is not lost so long as one disk survives. Total capacity of the array is substantially the capacity of a single disk and RAID (level) 5 combines three or more disks in a way that protects data against loss of any one disk; the storage capacity of the array is reduced by one disk.

Current implementations of RAID may have a variety of problems. These problems may stem from limitations imposed by the architecture of these RAID systems, such as the fact that in many instances all communications with a RAID system must be addressed to a single server which controls and manages the RAID system. Other problems may arise from the configuration or layout of the data on the disks comprising a RAID system. For example, in certain cases a RAID level must be chosen and storage allocated within the RAID system before the RAID system can be utilized. Thus, the initially chosen RAID level must be implemented in conjunction with the data stored on the RAID system, irrespective of whether that level of RAID is desired or needed. In many cases these existing problems may be exacerbated by the need to use custom hardware or software to implement these solutions, raising the costs associated with implementing such a solution.

Consequently, it is desired to substantially ameliorate these problems. Additionally, when ameliorating these problems it is desired to have solutions with increased performance or reduced latency.

SUMMARY

Embodiments of the systems and methods disclosed provide a distributed RAID system comprising a set of data banks. More particularly, in certain embodiments of a distributed RAID system each data bank has a set of associated storage media and executes a similar distributed RAID application. The distributed RAID applications on each of the data banks coordinate among themselves to distribute and control data flow associated with implementing a level of RAID in conjunction with data stored on the associated storage media of the data banks.

In certain embodiments, a high speed memory may be utilized to store the write cache on each data bank. By storing the write cache of a data bank on a high speed memory the performance and speed of such a high speed memory can be utilized to reduce the latency associated with responding to a WRITE command. By retaining the use of lower speed memory to implement at least some storage besides that need for the write cache, the speed and performance of high speed memory may be obtained with respect to responding to WRITE commands received from hosts 102 and the latency of such responses reduced while the advantages of lower cost are realized by using lower speed/lower cost storage for other aspects of a data bank.

In some embodiments, components of computing devices which are used to implement data banks may have more (or may be built to have more) computing power than may be needed to execute the distributed RAID application. In many cases, then the computing device (for example, processor, cache, memory, boards, etc.) used to implement a data bank may have unutilized computing power when used to execute only the distributed RAID application.

Therefore, embodiments may allow various applications which may utilize a distributed RAID system (or other types of applications) to be executed on the same set of computing devices which implement that distributed RAID system. To allow the distributed RAID application to be executed in conjunction with other applications on the same set of computing devices a virtualization layer may be executed on a data bank. Accordingly, embodiments of data banks may utilize the capabilities of the chipsets comprising the data bank and the virtualization layer executing on the data bank to substantially decrease latency imposed by use of such a virtualization layer.

More specifically, in certain embodiments, the virtualization layer may be configured such that it does not control access to the high speed memory of the data bank. Additionally, access to the high speed memory may be managed by the distributed RAID application executing on the data bank. In this manner, latency imposed by the virtualization layer may be substantially reduced with respect to accesses to the high speed memory and the advantages of storing the write cache on such high speed memory obtained.

Embodiments as disclosed herein include a system for implementing distributed RAID, comprising a plurality of data bank computers, each data bank coupled to each of one or more hosts and each of the other plurality of data banks, each data bank including, a processor, a data store, a high speed memory and a computer readable medium comprising instructions for a distributed RAID application, the instructions executable for: receiving a command corresponding to a first segment of a volume from a first host of the one or more hosts, wherein the volume and redundancy data corresponding to a RAID level implemented in conjunction with the volume are stored on each of the plurality of data banks, such that for each segment of the volume a corresponding redundancy segment comprising the redundancy data associated with that segment does not reside on the same data bank as the segment; determining if the first command is a write command and if the command is a write command storing the write command in a write cache on the high speed memory; determining a first data bank of the plurality of data banks, wherein the first data bank corresponds to the first segment; and if the first data bank is the data bank which received the command execute the first command with respect to the first segment and if not, forward the first command to the first data bank.

These, and other, aspects of the invention will be better appreciated and understood when considered in conjunction with the following description and the accompanying drawings. The following description, while indicating various embodiments of the invention and numerous specific details thereof, is given by way of illustration and not of limitation. Many substitutions, modifications, additions or rearrangements may be made within the scope of the invention, and the invention includes all such substitutions, modifications, additions or rearrangements.

BRIEF DESCRIPTION OF THE DRAWINGS

The drawings accompanying and forming part of this specification are included to depict certain aspects of the invention. A clearer impression of the invention, and of the components and operation of systems provided with the invention, will become more readily apparent by referring to the exemplary, and therefore nonlimiting, embodiments illustrated in the drawings, wherein identical reference numerals designate the same components. Note that the features illustrated in the drawings are not necessarily drawn to scale.

FIG. 5 is a block diagram of one embodiment of a table.

FIG. 7 is a block diagram of one embodiment of a table.

DETAILED DESCRIPTION

Figure 1:
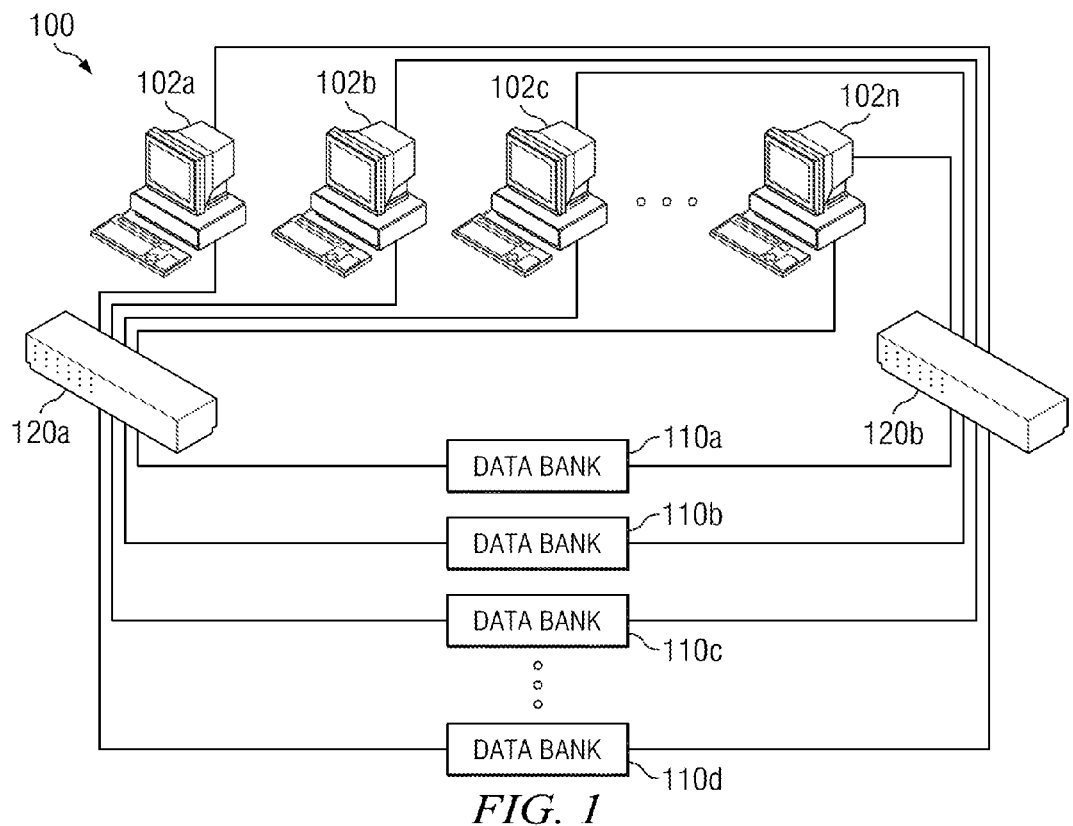
FIG. 1 is a block diagram of one embodiment of an architecture employing a distributed RAID system.

The invention and the various features and advantageous details thereof are explained more fully with reference to the nonlimiting embodiments that are illustrated in the accompanying drawings and detailed in the following description. Descriptions of well known starting materials, processing techniques, components and equipment are omitted so as not to unnecessarily obscure the invention in detail. It should be understood, however, that the detailed description and the specific examples, while indicating preferred embodiments of the invention, are given by way of illustration only and not by way of limitation. Various substitutions, modifications, additions and/or rearrangements within the spirit and/or scope of the underlying inventive concept will become apparent to those skilled in the art from this disclosure. Embodiments discussed herein can be implemented in suitable computer-executable instructions that may reside on a computer readable medium (e.g., a HD), hardware circuitry or the like, or any combination.

Before discussing specific embodiments, embodiments of a hardware architecture for implementing certain embodiments is described herein. One embodiment can include one or more computers communicatively coupled to a network. As is known to those skilled in the art, the computer can include a central processing unit ("CPU"), at least one read-only memory ("ROM"), at least one random access memory ("RAM"), at least one hard drive ("HD"), and one or more input/output ("I/O") device(s). The I/O devices can include a keyboard, monitor, printer, electronic pointing device (such as a mouse, trackball, stylist, etc.), or the like. In various embodiments, the computer has access to at least one database over the network.

ROM, RAM, and HD are computer memories for storing computer-executable instructions executable by the CPU. Within this disclosure, the term "computer-readable medium" is not limited to ROM, RAM, and HD and can include any type of data storage medium that can be read by a processor. In some embodiments, a computer-readable medium may refer to a data cartridge, a data backup magnetic tape, a floppy diskette, a flash memory drive, an optical data storage drive, a CD-ROM, ROM, RAM, HD, or the like.

At least portions of the functionalities or processes described herein can be implemented in suitable computer-executable instructions. The computer-executable instructions may be stored as software code components or modules on one or more computer readable media (such as non-volatile memories, volatile memories, DASD arrays, magnetic tapes, floppy diskettes, hard drives, optical storage devices, etc. or any other appropriate computer-readable medium or storage device). In one embodiment, the computer-executable instructions may include lines of complied C++, Java, HTML, or any other programming or scripting code.

Additionally, the functions of the disclosed embodiments may be implemented on one computer or shared/distributed among two or more computers in or across a network. Communications between computers implementing embodiments can be accomplished using any electronic, optical, radio frequency signals, or other suitable methods and tools of communication in compliance with known network protocols.

As used herein, the terms "comprises," "comprising," "includes," "including," "has," "having" or any other variation thereof, are intended to cover a non-exclusive inclusion. For example, a process, process, article, or apparatus that comprises a list of elements is not necessarily limited only those elements but may include other elements not expressly listed or inherent to such process, process, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

Additionally, any examples or illustrations given herein are not to be regarded in any way as restrictions on, limits to, or express definitions of, any term or terms with which they are utilized. Instead, these examples or illustrations are to be regarded as being described with respect to one particular embodiment and as illustrative only. Those of ordinary skill in the art will appreciate that any term or terms with which these examples or illustrations are utilized will encompass other embodiments which may or may not be given therewith or elsewhere in the specification and all such embodiments are intended to be included within the scope of that term or terms. Language designating such nonlimiting examples and illustrations includes, but is not limited to: "for example," for instance," "e.g.," "in one embodiment."

This application is related to U.S. patent application Ser. No. 12/479,319, entitled "Method and System for Distributed RAID Implementation," filed on Jun. 5, 2009; U.S. patent application Ser. No. 12/479,360, entitled "Method and System for Data Migration in a Distributed RAID Implementation," filed on Jun. 5, 2009; U.S. patent application Ser. No. 12/479,403, entitled "Method and System for Distributing Commands to Targets," filed Jun. 5, 2009; U.S. patent application Ser. No. 12/479,377, entitled "Method and System for Initializing Storage in a Storage System," filed Jun. 5, 2009; U.S. patent application Ser. No. 12/479,434, entitled "Method and System for Rebuilding Data in a Distributed RAID System," filed Jun. 5, 2009; U.S. patent application Ser. No. 12/479,394, entitled "Method and System for Placement of Data on a Storage Device," filed Jun. 5, 2009; U.S. patent application Ser. No. 12/490,810, entitled "Method and System for Execution of Applications in Conjunction with Distributed RAID," filed Jun. 24, 2009; and U.S. patent application Ser. No. 12/914,559, entitled "Method and System for Execution of Applications in Conjunction with RAID," filed Oct. 28, 2010; all of which are incorporated fully herein by reference.

A brief discussion of context particularly with respect to data storage may now be helpful. As discussed above, RAID systems divide and replicate data across multiple hard disk drives (or other types of storage media), collectively referred to as an array, to increase reliability and in some cases improve throughput of computing devices (known as a host) using these RAID systems for storage. However, current implementations of RAID may have a variety of problems. These problems may stem from limitations imposed by the architecture of these RAID systems, from the configuration or layout of the data on the disks comprising a RAID system or from the need to use custom hardware or software to implement these solutions, raising the costs associated with implementing such a solution. It is desired to substantially ameliorate these problems, among others.

To that end, attention is now directed to the systems and methods for implementing RAID. Embodiments of these systems and methods provide a distributed RAID system comprising a set of data banks. More particularly, in certain embodiments of a distributed RAID system each data bank has a set of associated storage media and executes a similar distributed RAID application. The distributed RAID applications on each of the data banks coordinate among themselves to distribute and control data flow associated with implementing a level of RAID in conjunction with data stored on the associated storage media of the data banks.

Specifically, in certain embodiments, a volume with an associated RAID level may be created using the distributed RAID system. Each of the distributed RAID applications can then coordinate operations associated with data of that volume such that data associated with that volume or the implementation of the desired RAID level in conjunction with that volume may be stored on the multiple data banks of the distributed RAID system.

By coordinating the implementation of a level of RAID in conjunction with a volume by storing both data of the volume and data associated with the implementation of RAID on multiple data banks using similar distributed RAID applications executing on each of those data banks a number of advantages may be achieved. Namely, different storage volumes may be allotted, with one or more of the volumes implemented in conjunction with different RAID levels. Moreover, as the coordination of storage and the implementation of RAID across the data banks is accomplished using substantially identical distributed RAID applications, in many cases standard or off-the-shelf hardware, such as standard x86 based servers and storage media may be utilized. Many other advantages may also be realized utilizing embodiments presented herein or other embodiments, and such advantages, which may or may not be pointed out in particular detail, will be realized after reading this disclosure.

Turning now to FIG. 1, a block diagram of an architecture for a system which utilizes one embodiment of a distributed RAID system is depicted. Distributed RAID system 100 includes a set of data banks 110, each data bank 110 communicatively coupled to both of switches 120. Each of switches 120 is also communicatively coupled to each host 102, such that a host 102 may communicate with each data bank 110 through a set of paths corresponding to a particular data bank 110, each path comprising one of the switches 120.

The communicative coupling between data banks 110, switches 120 and hosts 102 may be accomplished using almost any transport medium (either wired or wireless) desired, including Ethernet, SCSI, iSCSI, Fibre Channel, serial attached SCSI ("SAS"), advanced technology attachment ("ATA"), serial ATA ("SATA") or other protocols known in the art. Furthermore, the communicative coupling may be implemented in conjunction with a communications network such as the Internet, a LAN, a WAN, a wireless network or any other communications network known in the art.

In one embodiment, then, using a commands protocol, such as iSCSI, SCSI, etc., hosts 102 may communicate with data banks 110 to manipulate data. More particularly, each of data banks 110 comprises storage media (as will be explained in more detail later on herein). Collectively, the storage media in data banks 110 may be virtualized and presented to hosts 102 as one or more contiguous blocks of storage, storage devices, etc. For example, when the iSCSI protocol is utilized the storage media in data banks 110 may be presented to hosts 102 as a SCSI target with, in one embodiment, multiple ports.

Thus, during operation, in one embodiment a host 102 (or a user at a host 102 or interfacing with data bank 110) may request the creation of a volume and specify a level of RAID to be implemented in conjunction with that volume. Data associated with that volume and the implementation of the desired level RAID in association with that volume is stored across data banks 110. The hosts 102 may then access this volume using logical address corresponding to the volume or a portion thereof. In this manner, hosts 102 can utilize created volumes of storage and fault tolerance can be achieved in conjunction with these volumes substantially invisibly to hosts 102.

Figure 2A:
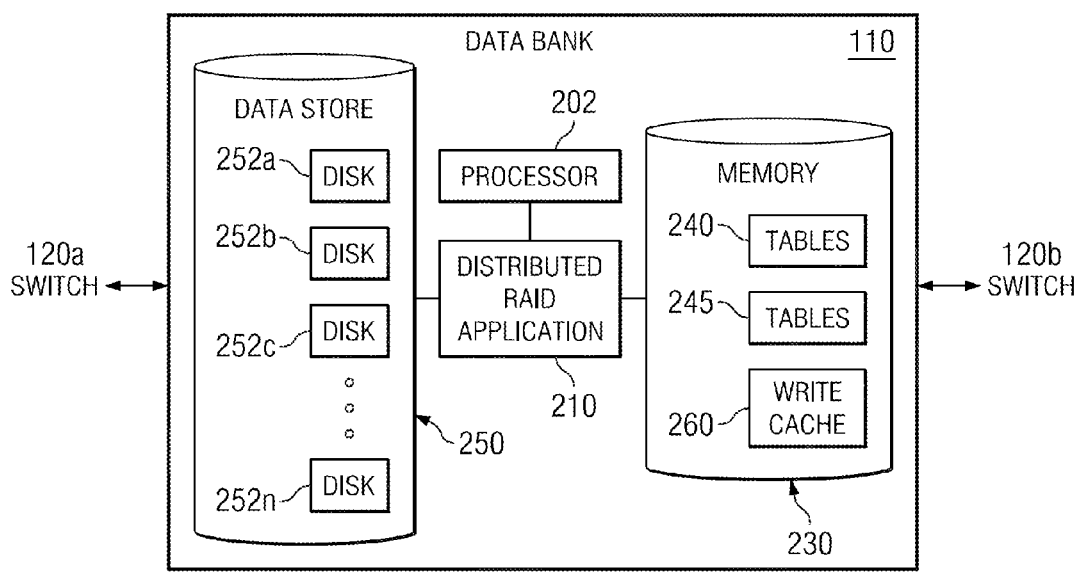
FIG. 2A is a block diagram of one embodiment of a data bank.

The virtualization of storage and the implementation of RAID utilizing data banks 110 may be better understood with reference to FIG. 2A which depicts a block diagram of one embodiment of a data bank 110 computer operable to implement distributed RAID. Here, data bank 110 comprises a data store 250, and a processor 202 operable to execute instructions stored on a computer readable medium, where the instructions are operable to implement distributed RAID application 210. Distributed RAID application 210 may periodically issue heartbeat communications to distributed RAID applications 210 on other data banks 110 to determine if there has been a fault with respect to that data bank 110. If the distributed RAID application 210 determines that another data bank 110 is experiencing a fault it may set one or more fault flags corresponding to that data bank 110. Using these fault flags for each distributed RAID application 210 on each data bank 110 a particular distributed RAID application 210 may determine if a certain data bank 110 is faulty.

Distributed RAID application 210 may also have access (for example, to read, write, issue commands, etc.) to data store 250 comprising one or more storage media, which may for example be disks 252 operating according to almost any protocol known, such as SATA, PATA, FC, etc. where each of the disks 252 may, or may not, be of equal size. Distributed RAID application 210, executing on each of data banks 110 can allow the allocation of and use of volumes using data stores 250 across data banks 110 and the implementation of RAID in conjunction with these volumes utilizing a set of global tables 240 shared between data banks 110, a set of local tables 245 and write cache 260, all of which may be stored in a memory 230 (which may be in data store 250 or may be another memory altogether).

Figure 2B:
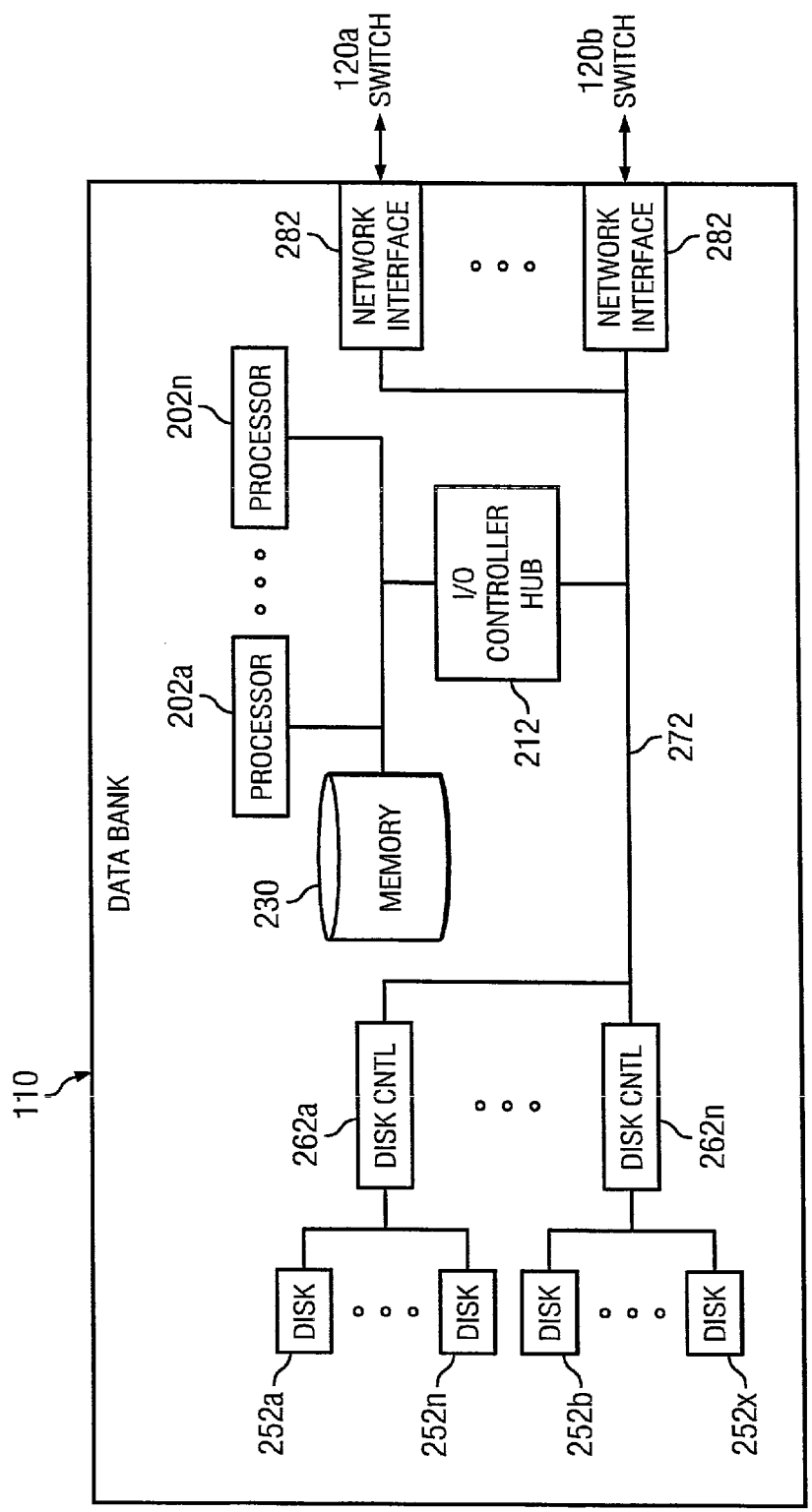
FIG. 2B is a block diagram of one embodiment of an architecture for a data bank.

FIG. 2B depicts a block diagram of one embodiment of a hardware architecture which may be used to implement data bank 110 computer operable to implement distributed RAID. In this architectural example, data bank 110 comprises one or more processors 202 which may adhere to the Intel x86 architecture or some other architecture altogether and a memory 230 coupled through a bus to I/O controller hub 212, which in one embodiment may be a southbridge chip or the like. The I/O controller hub 212 may, in turn, be coupled to and control a bus 272 such as a PCI-X bus, PCI-express bus, etc. Coupled to this bus 272 are one or more disk controllers 262 such as, for example, an LSI 1068 SATA/SAS controller. Each of these disk controllers 262 is coupled to one or more disks 252, where collectively these disks 252 may comprise data store 250. Additionally, one or more network interfaces 282 may also be coupled to bus 272. These network interfaces 282 may be network interfaces (such as Ethernet, etc.) which are included on motherboards, may comprise one or more network interface cards configured to interface via one or more protocols such as Ethernet, fibre channel, etc. or may be some other type of network interface such that data bank 110 may communicate with switched 120 through these network interfaces 282.

Figure 3:
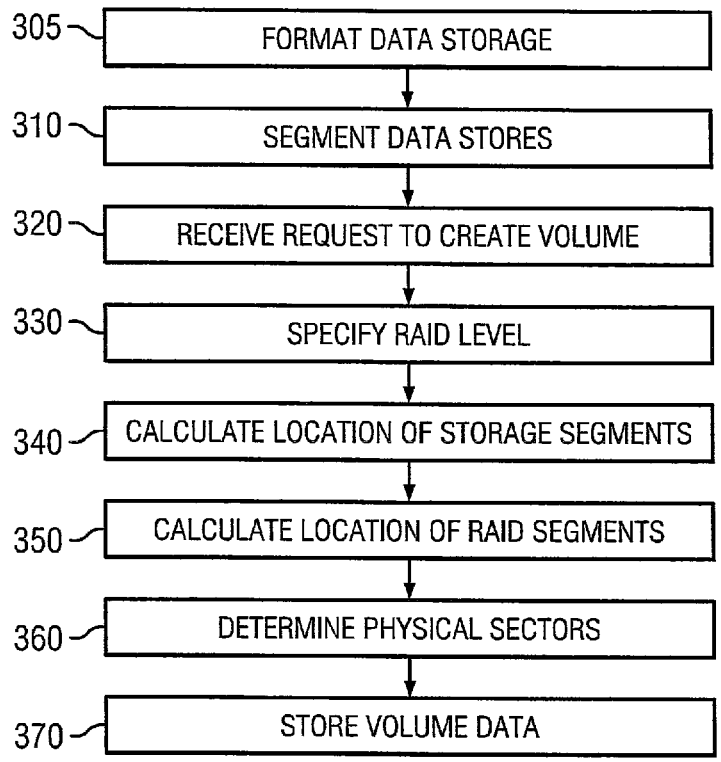
FIG. 3 is a flow diagram of one embodiment of a method implemented by a distributed RAID system.

Moving now to FIG. 3, one embodiment of a method for the allocation of volumes and the laying out of data associated with these volumes in data stores 250 across data banks 110 is illustrated. Initially, before volumes are to be allocated on a disk 252 of data store 250, the disk 252 may be formatted at step 305. As discussed above, in order to have the ability to easy and simply recover from any failures redundancy data may need to be accurate relative to any corresponding stored data. In many cases, this may entail that disks 252 utilized to store a volume be formatted by calculating redundancy data from the current data in the areas on disk 252 where portions of a volume are to be stored, even though data stored at these areas may currently be garbage values. These calculations may consume an undesirably large amount of time.

Furthermore, in a distributed RAID environment such as that detailed with respect to FIG. 1, other problems may present themselves. More specifically, as different portions of a volume may be stored on different data banks 110 and redundancy data corresponding to the volume may also be stored on various data banks 110, accomplishing this type of formatting may additionally require a great deal of communication between distributed RAID applications 210 on data banks 110, consuming processor cycles and communication bandwidth.

Thus, in one embodiment, to ensure that redundancy data corresponding to an area of a disk where data of a volume is to be stored is accurate relative to the area of disk 252 where that data of the volume is to be stored, a zero value may be written to the areas on disks 252 where data corresponding to the volume is to be stored and the areas on disk 252 where redundancy data is to be stored. By zeroing out both the areas of a disk 252 where data of a volume is to be stored and areas of disks 252 where redundancy data is to be stored it can be guaranteed that any data of the volume can be recreated from its corresponding redundancy data.

Zeroing disks 252 may have other advantages. Namely that no complex calculations may need to be performed to determine redundancy data and no communications between distributed RAID applications 210 may be to achieve relative accuracy between areas where a volume is to be stored and redundancy data corresponding to those areas.

Importantly, by zeroing out areas of disks 252 for use with a volume and its corresponding redundancy data a significant delay in the usability of RAID system 100 may be avoided. These advantages may be attained through the use of a process which substantially continuously during operation zeros out unallocated areas of disks 252 resulting, for example, from the initial use of distributed RAID system 100, the installation of new disks 252, the deletion of a volume, etc. In these instances, currently unallocated (i.e. not currently allocated) areas of disks 252 on each of data banks 110 may have zeros written to them (referred to as "zeroing" the area).

The unallocated areas of disks 252 which have been zeroed may be tracked such that when a command corresponding to a portion of a volume or redundancy data associated with a portion of a volume is received at a data bank 110 to which that portion is assigned, distributed RAID application 210 may check to determine if that portion has been assigned a corresponding area of disks 252 on data bank 110 where that portion has been assigned. If no corresponding area of disks 252 on data bank 110 has been assigned, distributed RAID application 210 may select an area of disks 252 which has been zeroed and assign this area of disks 252 to the portion of the volume or corresponding redundancy data.

By simultaneously zeroing out any unassigned areas which have not previously been zeroed and waiting until a command corresponding to a portion of a volume or redundancy data is received to assign a zeroed area of disks 252 to that portion distributed RAID system 100 may operate substantially immediately without a long involved formatting process and new disks 252 may be added and volumes deleted or freed relatively unobtrusively to the operation of distributed RAID system 100.

It will be noted, therefore, after reading the above that step 305 in which the disks 252 are formatted may be accomplished before, during or after the creation of a volume with respect to distributed RAID system 100 and that the placement of step 305 (and all other steps in all the flow diagrams herein) implies no order to the steps. As will also be noted after a thorough review of the rest of the steps in FIG. 3 and the remainder of the disclosure, a volume may be created and portions of the volume and redundancy data corresponding to the volume assigned to a data bank 110 before physical areas on disks 252 on these data banks 110 have been assigned to store the portions of the volume or redundancy data and that, furthermore, the zeroing of the physical areas on disks 252 used to store the data corresponding to such portions may occur before the creation of the volume or after the creation of the volume but before these physical areas are assigned to corresponding portions of the volume or redundancy data (as discussed in more detail later).

These locations may be better explained with reference to the concept of a segment which may be utilized by embodiments of a distributed RAID application 210, where a segment may be the size of 2048 logical block addresses (LBAs) (or some other size) and the size of the logical block address corresponds to the sector size of a disk 252. Disks 252 in the data store 250 on each of data banks 110 may therefore be separated into equal size segments (for example, 1 MB) at step 310. These segments may correspond to one or more contiguous data blocks of a disk drive 252. Therefore, when a user or host 102 requests the creation of a volume from distributed RAID application 210 at step 320 and specifies a level of RAID which will be used in conjunction with that volume at step 330, a number of these segments corresponding to the requested size of the volume plus the number of segments desired to implement the desired level of RAID in conjunction with the volume may be assigned to the volume at step 340.

Thus, the volume comprises a number of segments (also referred to as logical segments), where each of these segments may be associated with a particular data bank 110 such that the data bank 110 may be assigned to manage that segment of the volume. This segment may, for example, may be the size of 2048 logical block addresses (LBAs), where the size of the logical block address corresponds to the size sector size of a disk 252 (other arrangements and sizes will also be possible). In most cases the physical storage comprising that segment of the volume will be stored in the data store 250 of the data bank 110 which manages that segment, however, in other cases the data corresponding to that segment may be stored in the data store 205 of a different data bank 110 (in other words, in certain cases the data bank 110 comprising the distributed RAID application which manages that segment may be distinct from the data bank 110 comprising the data store 250 which stores the data corresponding to that segment).

In one embodiment, the allocation of segments to data banks 110 corresponding to a particular volume may be accomplished by determining a random permutation of the set of data banks 110 corresponding to the distributed RAID system 100. Thus, if there are six data banks a random permutation of size six, where the random permutation comprises each of the data banks may be determined such that the segments may assigned to each of the data banks consecutively in the order of the random permutation.

For example, suppose there are four data banks 110 in a distributed RAID system (call them data bank1, data bank2, etc.). A random permutation of data bank2, data bank4, data bank1 and data bank3 may be determined. In this case, the first segment corresponding to a volume is on data bank2, the second segment may be on data bank4, the third on data bank1, the fourth on data bank 3 and the fifth back again on data bank 4. In this way, the location of a particular segment corresponding with the volume may be determined mathematically if the random permutation corresponding to the volume is known.

As mentioned the user may specify that a level of RAID is to be implemented in conjunction with a volume at step 330. In this case, distributed RAID application 210 may ensure that any data corresponding to the implementation of RAID in conjunction with a volume is stored at an appropriate location at step 350 such that the RAID information is appropriately distributed across data banks 110 to ensure that the desired level of RAID is achieved.

For example, if it is desired to implement RAID 5 in conjunction with a volume, distributed RAID application 210 may determine a desired RAID parity group size (for example, based on a user configured RAID set or otherwise determined). This determination may be based on the number of data banks 110 in the distributed RAID system and may, in one embodiment, be one less than the number of data banks 110 (plus an additional one to account for the parity data).

To illustrate, if there were five data banks 110, for every four segments which store data associated with the volume (referred to as data segments), one segment would be dedicated to parity and the parity for the four segments calculated and stored in this parity segment, where the parity segment would be dedicated in a data bank 110 whose data store 250 does not comprise the data segments from which the parity data of the parity segment was calculated.

At this point, each segment corresponding to a logical volume has been assigned to a particular data bank 110 and any segments 100 to be utilized to store RAID data corresponding to the volume (referred to herein interchangeably as redundancy segments or parity segments, without loss of general applicability to the use of the segment to store any type of redundancy data associated with the implementation of any level of RAID in conjunction with a volume) have also been assigned to a data bank 110, however, physical sectors of the disks 252 of the data stores 250 of the data banks may not have yet been assigned to store the data corresponding to those segments. Thus, at step 360 physical segments of disks 252 on the data bank 110 to which a logical segment of the volume has been assigned may be determined and assigned to the logical segments. This segment mapping may be stored in the local tables 245 of each data bank 110. This assignment may, as mentioned earlier, take place at some later point, for example, when a command first attempts to write a logical segment.

When making this assignment, in one embodiment the areas different performance characteristics of disks 252 may be accounted for relative to the accessed logical segment. In other words, disks 252 may have segments which are more efficiently accessed than other segments of the same disk. Therefore, in one embodiment it may be desirable to assign physical segments of a disk 252 based upon criteria associated with the logical segment. The characteristics may include for example, such things as a quality of service designation associated with a volume corresponding to the logical segment, a number of accesses to the volume comprising the logical segment, etc.

At step 370, then, information corresponding to the volume may be stored, such that the location of segments corresponding to the volume, or segment corresponding to the implementation of RAID in conjunction with the volume, may be determined from this stored information. This stored information (collectively referred to as mapping data) may therefore include an identification for the volume, the random permutation corresponding to the volume (for example, indicating the order of data banks 110 on which the segments are located) and the parity group size of any RAID implementation (for example, if the volume corresponds to a 4+1 RAID set, a 7+1 RAID set, if RAID 1 is implemented, etc.). This data may be stored, for example, in global tables 240 such that it can be communicated to other distributed RAID applications 210 on other data banks 110 to ensure that at least a portion of the set of tables 240 associated with each distributed RAID application 210 remains substantially consistent and the location.

Figure 4:
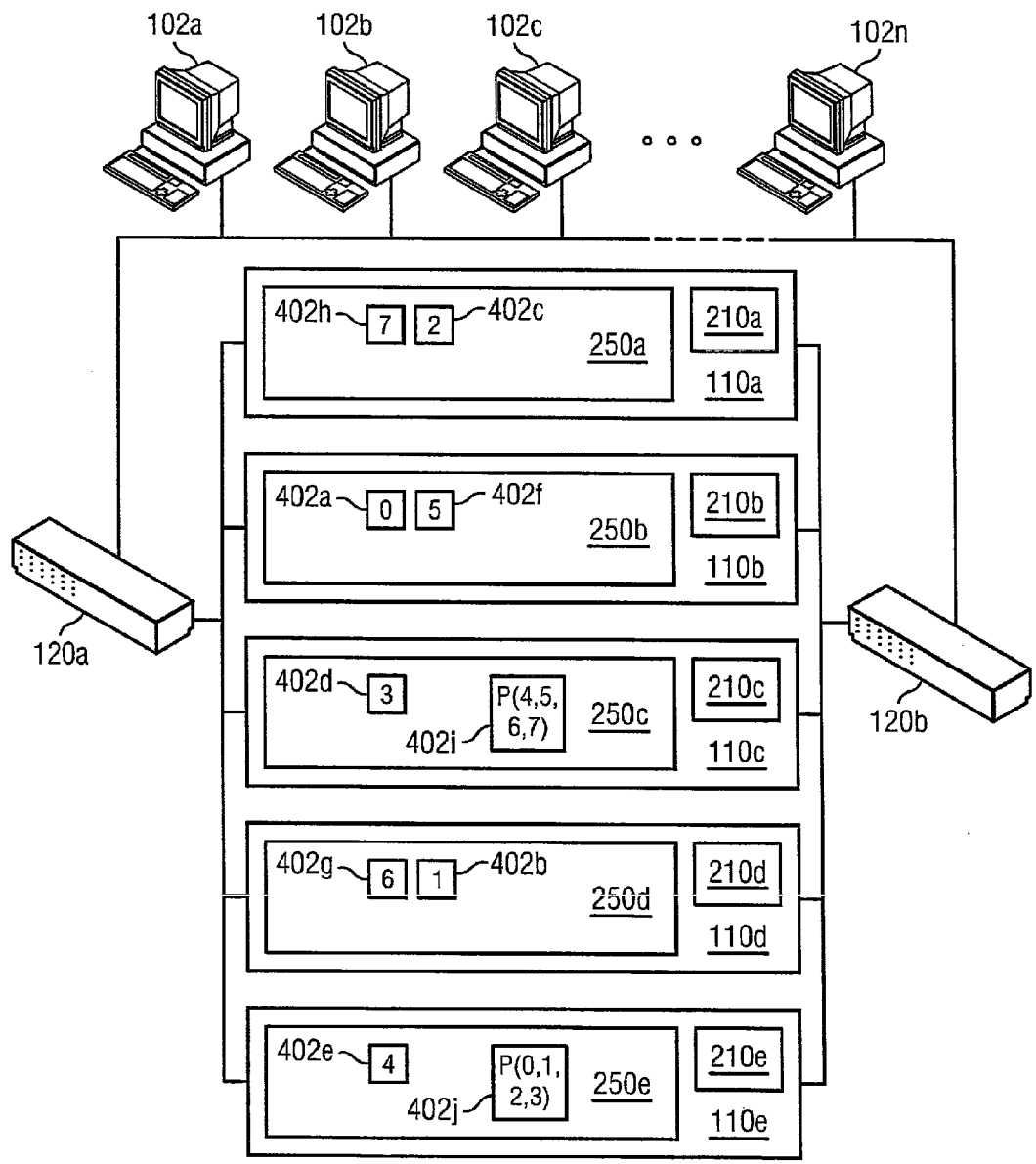
FIG. 4 is block diagram of an example of one embodiment of an architecture employing a distributed RAID system.

The above description may be better understood with reference to FIG. 4 which depicts one example of one embodiment of a distributed RAID system with five data banks 110. Here, each data store 250 of each data bank 110 has been laid out as a set of equally sized segments 402, which for purposes of this example will be assumed to be 1 MB in size. Suppose, now that a host 102 requests a volume of 8 MB with RAID level 5 from distributed RAID application 210b on data bank 110b. In this case, distributed RAID application 210b may determine that eight segments 402 are required for the data portion of the volume while two segments 402 segments may be required to store the redundancy data for the volume in conjunction with implementation of the desired RAID level for the volume. Distributed RAID application 210b may then determine a random permutation for the volume. For purposes of this example, assume that the random permutation is: data bank 110b, data bank 110d, data bank 110a, data bank 110c, and data bank 110e. Thus, data bank 110b may be assigned segment 402a, the first segment of the requested volume, data bank 110d may be assigned segment 402b, the second segment of the requested volume, data bank 110a may be assigned segment 402c, the third segment of the requested volume, data bank 110c may be assigned segment 402d, the fourth segment of the requested volume and data bank 110e may be assigned segment 402e, the fifth segment of the requested volume. The assignment then begins again with the first data bank 110 of the random order such that data bank 110b may be assigned segment 402f, the sixth segment of the requested volume, data bank 110d may be assigned segment 402g, the sixth segment of the requested volume and data bank 110a may be assigned segment 402h, the eighth segment of the requested volume.

Once the data segments 402a-402h for storing data associated with the volume have been assigned, distributed RAID application 210b may assign segments 402 for any data associated with the implementation of that RAID level. In this example, as RAID 5 is desired with respect to the volume, distributed RAID application 210b may determine that as five data banks 110 are being utilized a (4+1) parity set may be desired. Distributed RAID application 210b may then determine that to store the parity to implement RAID 5 in conjunction with eight segments 402 an additional two segments 402 may be needed.

Furthermore, it may be desired that the parity created utilizing a particular set of data segments 402 will not be stored on a data bank 110 having any of those set of data segments 402 in its data store. Thus, distributed RAID application 210b may also determine a location where each of the parity segments will be allocated based on the determined RAID parity group size, the location of the first data segment 402a, etc. Here, parity segment 402i which will store the parity data corresponding to the data stored in data segments 402a, 402b, 402c and 402d will be allocated in data store 250c of data bank 110c while parity segment 402j which will store the parity data corresponding to the data stored in data segments 402e, 402f, 402g and 402h will be allocated in data store 250e of data bank 110e. Notice here that the parity segments 402i, 402j which will store the parity information associated with the implementation of RAID in conjunction with the volume comprising data segments 402a-402h are laid out and sized substantially identically to as those segments 402a-402h which store the data associated with the volume.

Thus, when a host 102 accesses the volume, a request with a logical address corresponding to the first data segment of the volume may correspond to data segment 402a on data bank 110b, a request with a logical address corresponding to the second data segment of the volume may correspond to data segment 402b on data bank 110d, etc. Notice here, that the allocated data segments 402a-402h may reside on different data banks 110 and that the location of any allocated data segment 402a-402h may be determined using the random permutation associated with that volume (for example, as stored in global tables 240 at data banks 110). As discussed above, however, data stores 250 on data banks 110 have been virtualized, thus the requesting host may not be aware of the location of the data segments 402 in data stores 250, that multiple data stores 250 exist, that data stores 250 are spread across multiple data banks 110, etc. Host 102 believes it is addressing a single contiguous volume.

It will be apparent that the location of the data segments 402 on data banks 110 (and the corresponding random permutation of data banks 110) in this example is for purposes of illustration and that the data segments 402 of a volume may be located on any of data stores 250 on any of the data banks 110 according to almost any random, or other, permutation. Furthermore, it will be noted that while each of segments 402 is in this example 1 MB, these may be of any size without loss of generality and that a 1 MB size has been chosen solely for ease of illustration.

As can be seen from the above description then, the location of a particular data segment 402 or parity segment 402 can be determined algorithmically (for example, using the same random permutation used to assign segments for the volume, locate the parity segments for the volume, etc.) using the random permutation associated with the volume and the RAID parity group size. Thus, the information may be stored in conjunction with an identification corresponding to the volume, for example in set of global tables 240. Furthermore, these global tables 240 may be communicated between data banks 110, or otherwise updated, such that at least portions of the set of global tables 240 in each of the data banks 110 may be kept substantially consistent.

It may be helpful here to briefly delve into more detail regarding global tables 240 associated with distributed RAID application 210. As discussed, in one embodiment, global tables 240 may store information associated with volumes created by distributed RAID application 210 where those tables 240 can be used to determine a data bank 110 associated with a data segment within that volume or where a parity segment associated with a data segment corresponding to that volume is located. Global tables 240 may therefore comprise a set of tables, each table corresponding to a volume implemented with respect to databanks 110. In particular, one of these tables 240 may contain data which may be used to identify a data bank 110 whose data store 250 comprises a certain segment of a volume. Specifically, this table may be used to correlate a logical address associated with a volume with the data bank 110 where the segment (data, redundancy, etc.) corresponding to that logical address is stored.

FIG. 5 depicts a graphical representation of one embodiment of this type of table, where each volume may have an associated instance of such a table associated. Table 550 includes entries for LV number 504, segment size 508, segment count 512, quality of service (QOS) 514, range count 518, information for range entries, including in the embodiment depicted a first range 524a and a second range 524b and any additional range entries 524n.

LV number 504 is a unique number used to identify a particular volume, segment size 508 corresponds to the size of the segments used to implement the volume, segment count 512 corresponds to the number of segments corresponding to the logical volume (for example, both the number of data segments and redundancy segments, just the number of data segments, etc), QOS 514 indicates the quality of service which it is desired to implement with respect to the volume (note that this QOS indicator may indicate a priority to be given to that volume relative to other volumes stored on data banks 110) and range count 518 indicates a number of ranges associated with the volume, while range entries 524 each correspond to one of those ranges.

A range may correspond to a particular data bank 110 order and RAID implementation. Multiple ranges may be utilized to implement a volume for a variety of reasons. Specifically, for example, multiple ranges may be utilized in conjunction with a volume because different data stores 250 at different data banks 110 may have different amounts of storage in data store 250 available for use. This may lead to a situation where for example, for a first range of a volume all data banks 110 may be utilized in conjunction with a first RAID implementation while in a second range of a volume fewer than all the data banks 110 available may be utilized in conjunction with a second RAID implementation (where the first and second RAID implementations may, in fact, be different levels than one another). Each of these ranges may therefore correspond to segments laid out according to different data bank 110 orders (for example, random permutations, etc.), having a different number of data banks 110 available for use, a different type of RAID, etc.

To illustrate using a concrete example, brief reference is made back to FIG. 4. Suppose that the volume of 8 MB with RAID level 5 is laid out as shown, where the data segments are laid out according to the order data bank 110b, data bank 110d, data bank 110a, data bank 110c, and data bank 110e and RAID 5 is implemented in conjunction with the volume utilizing a (4+1) parity set may be desired with the parity segments assigned in data store 250c of data bank 110c and data store 250e of data bank 110e.

Now suppose that it is requested to add an additional 3 MB to this volume. However, suppose in this instance that data stores 250 of data banks 110e, 110c and 110d have no more room. Thus, in this case the only solution may be to allocate the additional desired 3 MB between data banks 110a and 110b which have remaining storage in data stores 250. Furthermore, as only two data banks 110 may be available for use it may only be possible to utilize a RAID level of 1 instead of RAID 5 as utilized with the first 8 MB of the volume. Thus, in this case the first 8 MB of the volume may correspond to a first range, and have a first range entry in a table corresponding to the volume with a first set of values while the next 3 MB of the volume may correspond to a second range, and have a second range entry in a table corresponding to the volume with a second set of values. As may be apparent after reading this disclosure, this type of occurrence may occur with some frequency.

Returning to FIG. 5, to deal with these types of situations, among others, each range of a volume may have an entry in a table 550 such that the location of segments in that particular range may be determined from the range entry corresponding to that range. Entries 524 for each of the ranges of the volume corresponding to the table 550 are associated with range count 518. In one embodiment, range count 518 may correspond to the number of ranges of a volume such that the number of range entries 524 corresponds to the range count 518. While only range entries 524a and 524b are shown it will be noted that the number of range entries 524 in a table will depend on the number of ranges corresponding to the volume to which that table corresponds. Thus, if a volume is divided into three ranges, there will be three range entries 524 in table 550 such that there is a range entry 524 comprising information for each range of the volume corresponding to table 550.

Information for a range entry 524 includes type 526, start 530, end 534, network RAID 538, network RAID size 542, disk RAID 546, disk RAID size 550, databank count 554, databank order 558 and a disk count 562 and disk order 566 corresponding to each data bank 110 used to store segments associated with range 524 (in other words there will be a disk count 562 and disk order 566 equal to databank count 554 of that range entry 524). Type 526 describes the type of the range corresponding to information for range entry 524: for example, normal, source (SRC), destination (DST) or other type of range. Start 230 is the first logical segment address of the range of the volume corresponding to range entry 524. End 234 is the last logical segment address of the range corresponding to information for the range of the volume corresponding to range entry 524. Other arrangements are also possible, for example, end 524 may be a count which is the maximum number of segments or blocks in the range, etc.

Databank count 554 may correspond to the number of data banks 110 on which the range corresponding to the range entry resides, databank order 558 may be the order in which segments in that range were assigned to data banks 110 while network RAID 538, network RAID size 542, disk RAID 546 and disk RAID size 552 may correspond to the type of RAID implemented in conjunction with the range of the volume corresponding to range entry 524.

Network RAID 538 is the type of RAID being implemented in association with the volume corresponding to the table 550, for example, RAID 0, RAID 1 or RAID 5 or other RAID types. Network RAID Size 542 is the parity group size of the RAID type used in the range. The Network RAID Size 542 may be limited by the number of data banks 110 in the range to be less than or equal to the number of databanks in the range corresponding to information for range 524. Disk RAID 546 is the type of RAID being implemented across disks in the databanks in the range. Disk RAID size 552 may be the parity group size of the RAID type used across the disks 252 in the data store 250 of each data bank 110 and may be limited to be less than or equal to the number of disks in the databank. In embodiments, RAID across the disks in the databanks 110 in the range is optional and may or may not be used. In such embodiments, either Disk RAID 546, Disk RAID Size 552 or both may not be used or may be omitted.

Data bank count 554 is the number of databanks in the range and Databank order 558 is the order in which RAID is implemented (for example, striped) across the data banks 110 in the range. For example, data banks 110 may have data corresponding to the logical addresses of the volume saved in a certain order and databank order 558 corresponds to this order. Disk count 562 is the number of disks within a data bank 110 of the range and disk order 566 is the order in which RAID is implemented across disks of a particular databank 110. For example, disks 252 may have segments saved to them in a certain order and disk order 566 is the order in which segments are stored across disks 252 in a data bank 110. Thus, for each databank 110 used to store segments of the range associated with the range entry 524 there will be a corresponding disk count 562 and disk order 566 (in other words the number of disk counts 562 and disk orders 566 will, in one embodiment, be equal to databank count 554 of that range entry 524). In embodiments, RAID across disks 252 in the data banks 110 is optional and may not be used. It will be noted that while table 550 has been described with specificity, this description is by way of example, not limitation and other forms of table 550 may be utilized. For example, a virtual table may be used instead of table 550 and may explicitly list the segment 402 and data bank 110 corresponding to each logical address.

Thus, as discussed earlier, information in table 550 may be used to identify a data bank 110 comprising a data segment 402 corresponding to a logical address (referenced by a host 102 in a command or in any other context). For example, knowing the size of segments 402 and using start 530, end 534, the range entry 524 corresponding to the address, etc., the particular data bank 110 corresponding to a logical address of the volume can be determined.

While one or more portions of tables 240 may be substantially identical across all data banks 110 and may describe one or more logical volumes which span one or more data banks 110 as described above, other tables 245 on a data bank 110 may be distinct to the data bank 110 to which it corresponds (for instance, table 245 may be unique to the data bank 110 on which the corresponding distributed RAID application 210 is executing). This table 245 may comprise data pertaining to each disk 252 contained in the data store 250 of the corresponding data bank 110 and may comprise information on where information is stored on or among disks 252 of the data store, for example, the sector of a disk 252 where a segment 402 assigned to the data bank 110 is located in data store 250.

Figure 6:
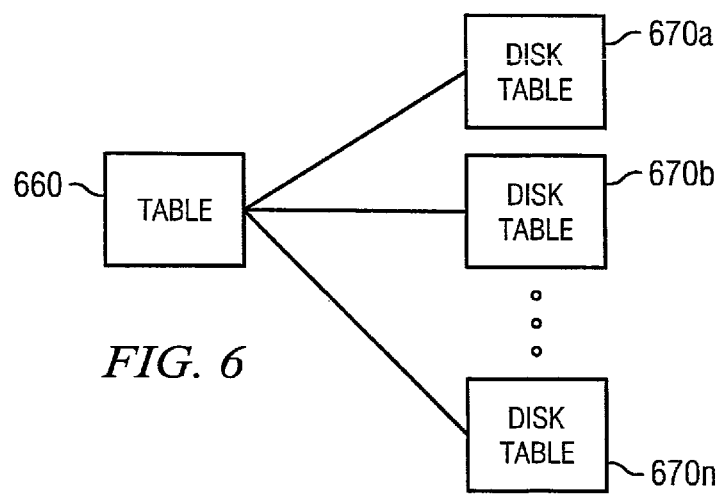
FIG. 6 is a block diagram of one embodiment of a table.

In FIG. 6 a graphical representation of one embodiment of this type of table is depicted. Table 660 may be stored at a particular data bank 110 and comprise multiple disk tables 670, each of the disk tables 670 corresponding to a disk 252 of the data store 250 within that data bank 110 and listing the location of the segments stored within that disk 252. More specifically, in most cases disks 252 are divided into physical sectors, each physical sector having a corresponding address or range of addresses.

A disk table 670 may be a mapping table which can be utilized to determine the location of a sector of a disk 252 of the data bank 110 where a segment of a volume is stored. Thus, using a table 670 the address of a sector on a disk 252 corresponding to a segment of a volume can be determined. Furthermore, the table may contain one or more flags or descriptive bits per entry corresponding to a segment or sector of the disk, describing the sector or segment stored at that sector.

Referring now to FIG. 7, a graphical representation of one embodiment of a disk table 670 is depicted. Disk table 670 has multiple entries, each entry corresponding to a physical segment of the corresponding disk such that the entries of disk table 670 describe the physical segments of the disk 252. Each entry in disk table 670 may also include one or more flags or bit fields describing the physical segment or segment of the volume stored at the corresponding sector. More particularly, as shown in FIG. 7, in one embodiment entries in disk table 670 include fields for a logical volume (LV) number, logical segment number, address space and sector state. LV number identifies the logical volume to which data stored at that physical segment corresponds. Logical segment number identifies the segment of the logical volume corresponding to that data. Address space identifies the segment stored as 'data' or 'redundancy'. A value of 'data' may indicates that data is stored at the sector represented by the entry, whereas a value of 'redundancy' indicates that the information stored at the sector may be used for RAID data protection and, depending upon the RAID level, may be redundant data, mirrored data or parity information. Sector state indicates the state of the segment as being 'allocated', 'zeroed' or 'dirty'. 'Allocated' indicates the segment has been allocated and may comprise valid data. 'Zeroed' indicates the segment has been zeroed out by writing zeros to the segment and 'dirty' indicates the segment may comprise garbage are otherwise unusable or undesirable values, for example because the segment has not been zeroed out or allocated, may be storing random bits or data. In one embodiment, for example, for a new disk all segments of the disk may be marked as dirty in a disk table corresponding to the new or newly added disk.

After reading the above description of the tables it will be apparent that distributed RAID application 210 may utilize the global tables 240 to determine which segment corresponds to a logical address of a volume, on which data bank 110 segments corresponding to a volume (either data or redundancy segments) are located, which segment of a volume corresponds to a logical address of a volume, where RAID data (parity data, mirror data, other types of redundancy data, etc.) associated with a segment of a volume is located, which disk 252 on a particular databank 110 comprises a segment or other information regarding volumes, segments, or disks 252 corresponding to that particular data bank 110 or other information regarding volumes, segments 402, data banks 110, RAID data, etc.

Similarly, distributed RAID application 210 on each individual data bank 110 may use local tables 245 on that data bank 110 to determine where on that data bank 110 (which sector(s) of disk 252, etc.) a particular segment is located or other information regarding volumes, segments, or disks 252 corresponding to that particular data bank 110.

Using the combination of the global table 240 shared between data banks 110 and the local tables 245 corresponding to each individual data bank 110 then, certain operations may be performed by the distributed RAID applications 210 on data banks 110 in cooperation with one another. These types of operations will now be discussed in more detail. Specifically, one embodiment of the implementation of a READ command and a WRITE command on a volume where RAID level 5 has been implemented in conjunction with the volume will now be discussed in more detail followed by concrete examples of the implementation of these commands with respect to an example distributed RAID system. It will be noted how other types of embodiments, commands, RAID levels, etc. may be implemented after a thorough review of this disclosure.

Figure 8:
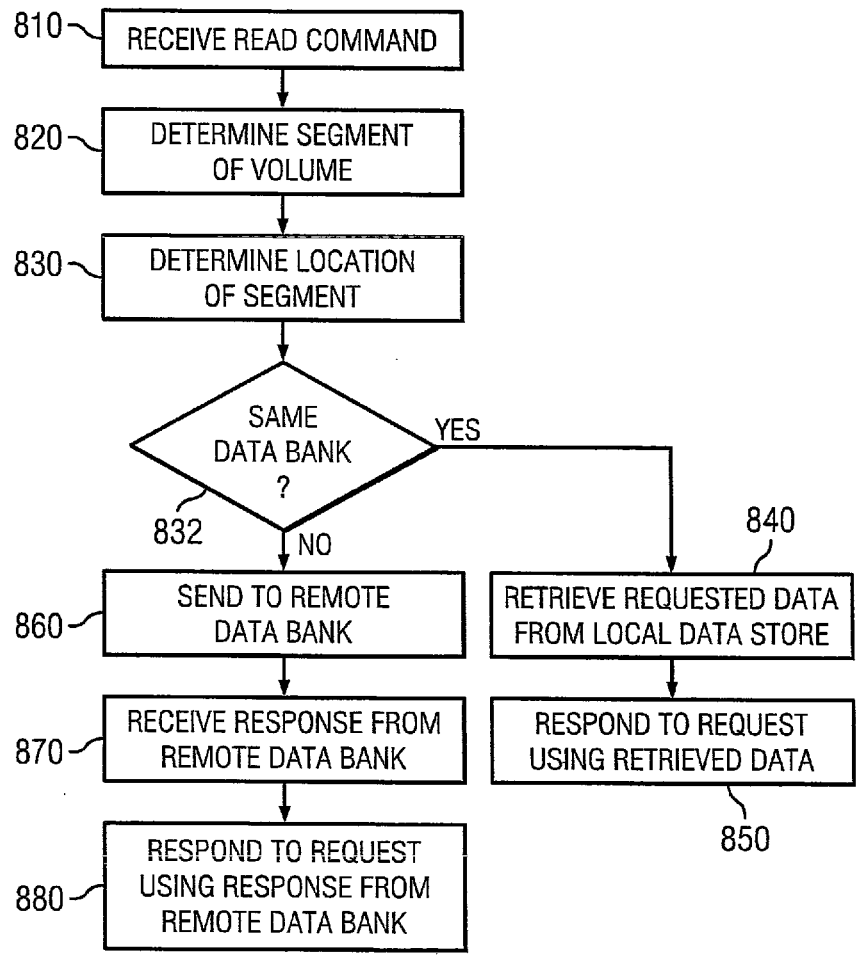
FIG. 8 is a flow diagram of one embodiment of a method implemented by a distributed RAID system.

Looking first at FIG. 8, a flow diagram for one embodiment of a method for implementing a READ command in a distributed RAID system is depicted. This READ command may be sent by a host 102 to a data bank 110 through a switch 120 or from one data bank 110 to another data bank 110. In certain embodiments, host 102 may comprise one or more applications and associated routing information such that a READ command may be routed from the host 102 issuing the command to an appropriate data bank 110 along a path between the issuing host 102 and the appropriate data bank 110. In other cases, however, no such application or routing information may be present on host 102 and thus a READ command issued from a host 102 may be routed to any of data banks 110. It is the latter case that will be illustrated in this embodiment. After reviewing the description of this embodiment, however, it will be noted by those of skill in the art which steps are applicable to the former case as well.

At step 810, then, a READ command may be received at a data bank 110. The distributed RAID application 210 on data bank 110 may determine, at step 820, a segment of a volume which corresponds to a logical address referenced in the received READ command and on which data bank 110 the segment of the volume is stored at step 830. As discussed above, this information may be determined using the global tables 240 associated with the distributed RAID application 210. If the data bank 110 which is storing the segment is the same as the data bank 110 which received the READ command (as determined at step 832) the requested data can be obtained from the appropriate disk 252 of the data store 250 on the receiving data bank 110 at step 840 and at step 850 the READ command responded to. As discussed above, the particular disk 252 of a data store 250 of the data bank 110 on which a segment is stored can be determined using global tables 240 while the location on that disk 252 where the data corresponding to the segment is stored may be determined using local tables 245 which may be used to map a segment of a volume to a physical location on a disk 252. If the receiving data bank 110 received the READ command from the host 102 the host 102 may be responded to while if the receiving data bank 110 received the READ command from another data bank 110 the response may be sent to the distributed RAID application 210 on the data bank 110 which issued the READ command.

If, however, the segment is stored on a remote data bank 110 (a data bank 110 other than the one which received the command) at step 860 the READ command may be sent to the distributed RAID application 210 at the remote data bank 110. In one embodiment, this READ command may be communicated to the distributed RAID application 210 at the remote data bank 110 using a command format utilized by distributed RAID application 210. This command, while providing pertinent information of the original READ command may also instruct the distributed RAID application to return the result of the READ command to the data bank 110 which originally received that READ command, or to perform other functionality. Accordingly, after the READ command is sent to the remote data bank 110 at step 870 a response comprising the requested data may be received from the remote data bank 110 and at step 880 the received READ command responded to using the data received in that response.

Figure 9A:
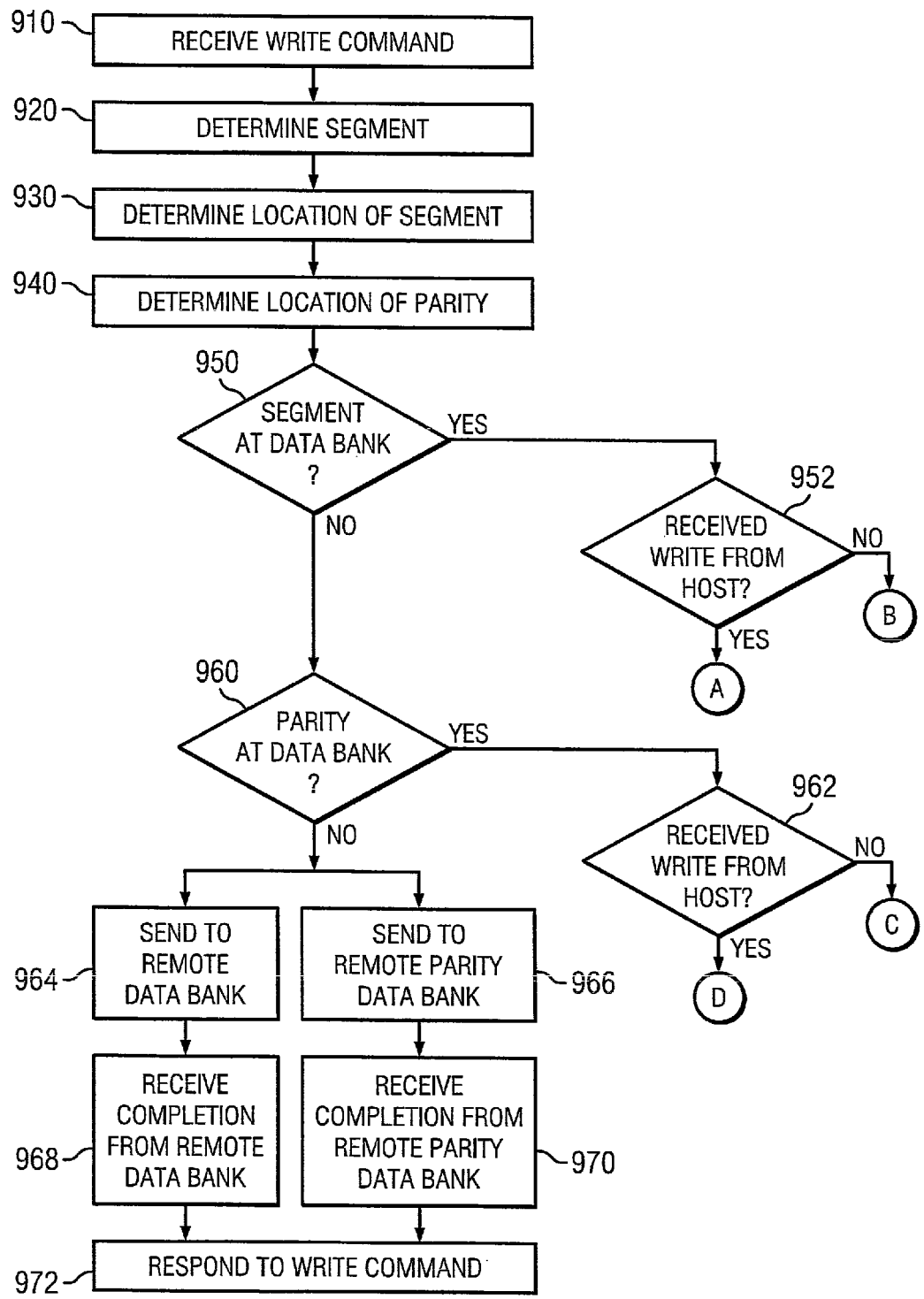
FIG. 9A is a flow diagram of one embodiment of a method implemented by a distributed RAID system.
Figure 9B:
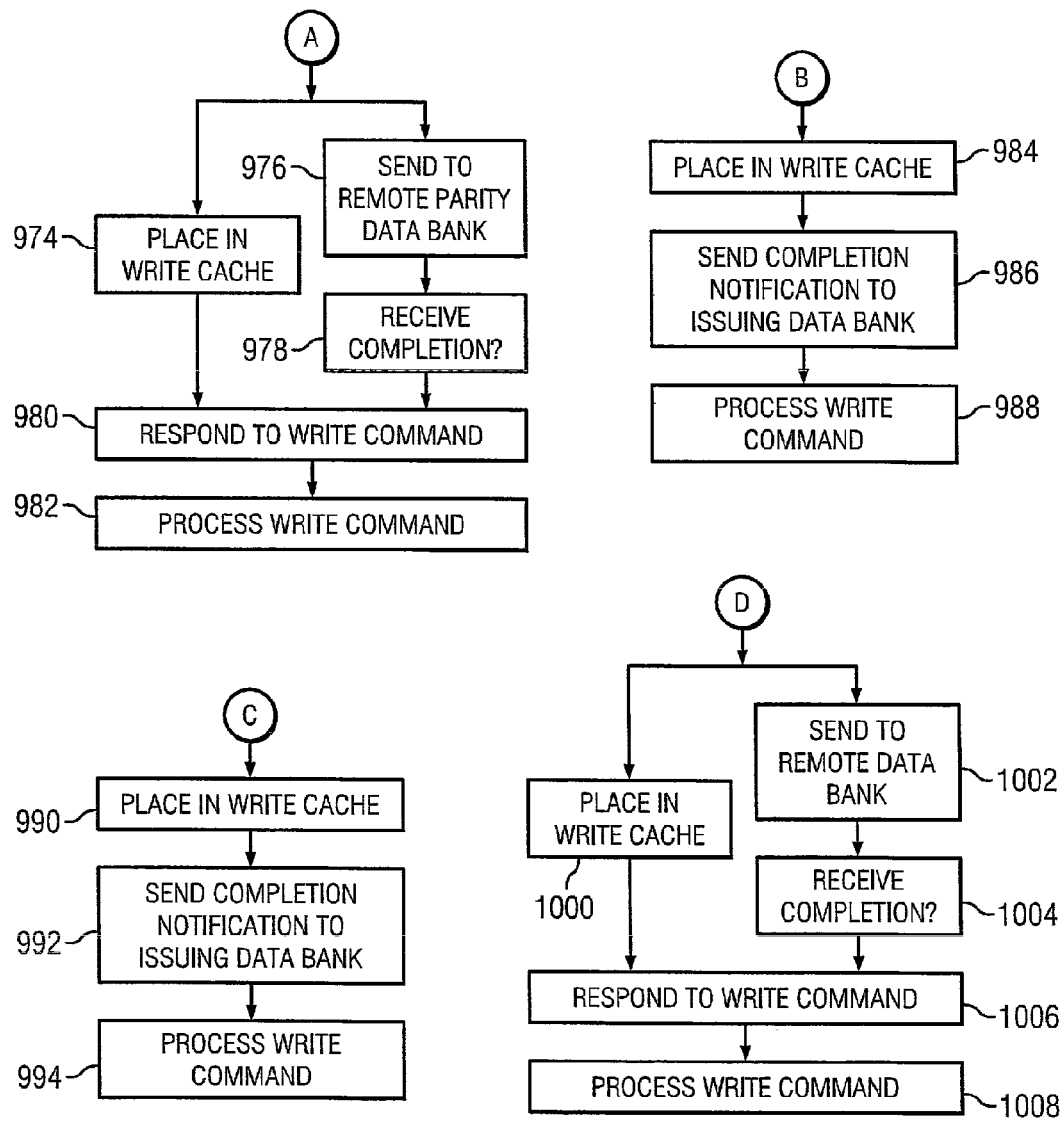
FIG. 9B is a flow diagram of one embodiment of a method implemented by a distributed RAID system.

Moving, now to FIGS. 9A and 9B, a flow diagram for one embodiment of a method for implementing a WRITE command in a distributed RAID system is depicted. This WRITE command may be sent by a host 102 to a data bank 110 through a switch 120 or from one data bank 110 to another data bank 110. In certain embodiments, host 102 may comprise one or more applications and associated routing information such that a WRITE command may be routed from the host 102 issuing the command to an appropriate data bank 110 along a path between the issuing host 102 and an appropriate data bank 110. In other cases, however, no such application or routing information may be present on host 102 and thus a WRITE command issued from a host 102 may be routed to any of data banks 110. It is the latter case that will be illustrated in this embodiment. After reviewing the description of this embodiment, however, it will be noted by those of skill in the art which steps are applicable to the former case as well.

At step 910, then, a WRITE command may be received at a receiving data bank 110. The distributed RAID application 210 on receiving data bank 110 may then determine at steps 920, 930 and 940 the segment of the volume corresponding to a logical address referenced by the WRITE command, the location of that segment (for example, which data banks 110 is storing the data corresponding to that segment) and the location of the parity corresponding to that segment (for example, which data bank 110 is storing the segment where parity data created from the data corresponding to that segment is stored). As discussed above, the location of both the data segment and the parity segment may be determined using global tables 240 stored on the receiving data bank 110.

If neither the data segment (the segment storing the data) nor the redundancy segment (in other words, where the parity or other type of redundancy data created from the data segment) is stored on the receiving data bank 110 (as determined at steps 950 and 960) the WRITE command may be communicated to the distributed RAID application 210 on the remote data bank 110 on which the data segment is stored at step 964 and to the distributed RAID application 210 on the remote parity data bank 110 on which the parity segment is stored at step 966. In one embodiment, this WRITE command may be communicated to the distributed RAID applications 210 at the remote data bank 110 and the remote parity data bank 110 using a command format utilized by distributed RAID applications 210. This command, while providing pertinent information of the original WRITE command may also instruct a distributed RAID application 210 to perform other desired functionality.

Accordingly, after the WRITE command is sent to the remote data bank 110 and the remote parity data bank completion notifications may be received from the distributed RAID applications 210 on the remote data bank 110 and the remote parity data bank 110 at steps 968 and 970. Once these acknowledgments are received the WRITE command may be responded to by the distributed RAID application 210 on the receiving data bank 110.

Returning to step 950, if, however, the data segment is stored at the receiving data bank 110, it may be determined if the WRITE command was received from a host 102 or another data bank 110 at step 952. If the WRITE command was received from a host 102 the WRITE command may be communicated to the distributed RAID application 210 on the remote parity data bank 110 at step 976 and placed in the write cache of the receiving data bank 110 at step 974. After receiving a completion notification from the distributed RAID applications 210 on the remote parity data bank 110 at step 978, the WRITE command may be responded to by the distributed RAID application 210 on the receiving data bank 110 at step 980 (for example, a response sent to the host 102). Furthermore, the WRITE command itself may be processed at step 982. This process may entail the storing of data associated with the WRITE command to the data segment stored on the receiving data bank 110 or other functionality.

On the other hand, if the WRITE command was not received from a host at step 952 this may indicate that the WRITE command was received from another data bank 110 (which, in many cases, may have been the data bank 110 which originally received the WRITE command from a host 102). In this case, the data bank 110 may place the received WRITE command in its write cache at step 984 and sends a completion notification to the issuing data bank 110 at step 986. At some later point then, the WRITE command itself may be processed at step 988.

Returning again to step 950, if the data segment is not stored at the receiving data bank 110 but the parity segment is stored at the receiving data bank 110, as determined at step 960, it may be determined if the WRITE command was received from a host 102 or another data bank 110 at step 962. If the WRITE command was received from a host 102 the WRITE command may be communicated to the distributed RAID application 210 on the remote data bank 110 where the data segment corresponding to the WRITE is stored at step 1002 and placed in the write cache of the receiving data bank 110 at step 1000. After receiving a completion notification from the distributed RAID applications 210 on the remote data bank 110 at step 1004 the WRITE command may be responded to by the distributed RAID application 210 on the receiving data bank 110 at step 1006 and the write command processed at step 1008 by the receiving data bank 110.

Here, processing the write command may entail that the parity segment stored at the receiving data bank 110 may be updated based upon the write command. This update of the parity segment may be accomplished in a variety of ways, not all of which will be elaborated on herein but which will be known to those of ordinary skill in the art. For example, distributed RAID application 210 on parity data bank 110 may perform a backed out write in order to update the parity segment. Performing this backed out write may entail obtaining data segments from which the parity segment and performing logical operations (such as exclusive OR (XOR) operations) using the obtained data segments and the data to be written associated with the WRITE command. Alternatively, if distributed RAID application 210 on receiving data bank 110 has multiple WRITE commands corresponding to each of the data segments from which the parity segment was created, a new parity segment may be calculated and the original parity segment may be updated by replacing it with the newly calculated parity segment. Other methods for updating the parity segment may be realized from a review of the disclosures herein and the particular method utilized to update a parity segment by a distributed RAID application may depend on a variety of factors, including configuration parameters, the availability of certain data (for example, WRITE commands corresponding to all data segments used to create the parity, etc.) or any of a number of other factors.

Returning now to step 962, if the WRITE command was not received from a host this may indicate that the WRITE command was received from another data bank 110 (which, in many cases, may have been the data bank 110 which originally received the WRITE command from a host 102). In this case, the WRITE command may be placed in the write cache of the receiving data bank 110 at step 990 and a completion notification sent to the issuing data bank at step 992. The WRITIE command may then be processed at step 994 (for example, the parity segment may be updated as discussed above).

After reviewing the above discussion it will be noted that in many cases, a distributed RAID application 210 at a particular data bank 110 may not be able to process a received WRITE command until notification is received from a parity data bank 110, that a parity data bank may need to evaluate multiple received WRITE commands to determine or implement a method for updating the parity or any of a number of other instances when it may be desired to store one or more WRITE commands or evaluate a set of these stored WRITE commands. To facilitate the storage and evaluation of WRITE (or other) commands, each distributed RAID application 210 may have an associated write cache 260.

Figure 10:
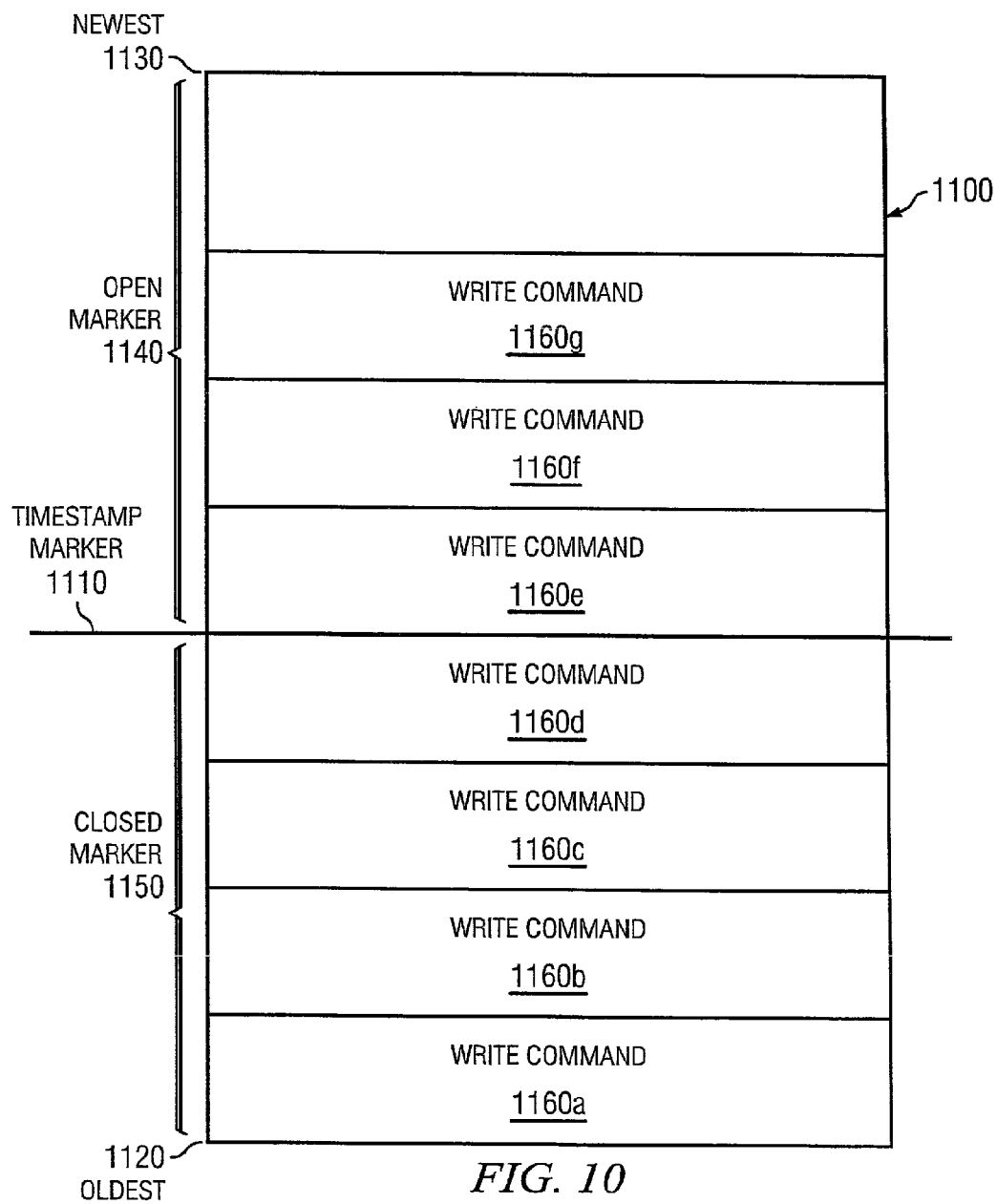
FIG. 10 is a block diagram of one embodiment of a write cache.

A representation of one embodiment of a write cache is depicted in FIG. 10. As WRITE commands are received by distributed RAID application 210 they are placed in write cache 1100. Each of these WRITE commands 1160 may have an associated timestamp indicating when the WRITE command 1160 was received. Thus, in one embodiment write cache 1100 may comprise a queue of time stamped WRITE commands 1160. At some point a timestamp marker may be issued by distributed RAID application 210. This timestamp marker may comprise a time and be communicated to each of distributed RAID applications 210. When to issue a timestamp market may be determined in a variety of ways, such as when the write cache 1100 is a certain percentage full or when a certain number of WRITE commands 1160 have been received, at a certain time interval or a variety of other methodologies.

In any event, this timestamp marker 1110 will segment each of the write caches 1110 associated with each of the distributed RAID applications 210 into at least two segments a closed marker 1150 comprising WRITE commands 1160 received before the timestamp marker 1110 (in this example WRITE commands 1160*a*, 1160*b*, 1160*c* and 1160*d*) and an open marker 1140 comprising WRITE commands 1160 received after the timestamp marker 1110 (in this example WRITE commands 1160*e*, 1160*f* and 1160*g*). Distributed RAID application 210 may then evaluate the set of WRITE commands 1160 in the closed marker 1150 (in this example WRITE commands 1160*a*, 1160*b*, 1160*c* and 1160*d*) to determine how these WRITE commands 1160 are to be processed while received WRITE commands may still be added to open marker 1140. This evaluation may comprise an elevator sort of the WRITE commands 1160, for example based on the distance required to move the heads to access a location on one or more disks 252 corresponding to a WRITE command.

Conversely, as the closed marker 1150 comprises a set of WRITE commands which are no longer changing distributed RAID application may evaluate this set of WRITE commands 1160 with respect to one another (or other criteria) to determine an order of execution (and may therefore reorder WRITE commands 1160 in closed marker 1160), a methodology to update a parity segment (for example, if there are WRITE commands in closed marker 1150 which correspond to each data segment used to create a parity) or make other determinations associated with the processing of WRITE commands 1160. It will be noted that as a timestamp marker 1110 may be issued for multiple reasons by any of distributed RAID applications 210 on each of data banks 110, multiple closed markers may exist at any one point, for example, when multiple timestamp markers 1110 are issued by distributed RAID applications 210 between the time the write cache is evaluated by any one of the distributed RAID applications 210.

After reviewing the above it will be noted that after a WRITE command is placed in the write cache of a data bank 110 a response may be sent to the host 102 which issued the WRITE command. The WRITE command can then be processed at a later point (see, for example, FIGS. 9A and 9B). Thus, an application or host 102 which issued such a WRITE command may receive a response indicating that an issued WRITE command was processed and may continue operating as if the WRITE command was processed even though the WRITE command may not be processed until a later point. By placing a received WRITE command in a write cache, then responding to the issuing host before the actual WRITE command is processed latency may be reduced as the host 102 or application may continue to operate (as the host 102 or application has received a communication indicating that the WRITE command has been completed or has otherwise been accommodated) even though the actual WRITE command has yet to be processed. Additionally, performance with respect to the processing of the WRITE command may be improved as well, as the processing of the WRITE command may be optimized as the WRITE command does not necessarily have to be performed in the order in which it was received or at the time it was received.

To obtain such advantages substantially without loss of data, in some embodiments, not only may a received WRITE command be placed in a write cache before a response is sent to the host, but the write cache may be stored in some form of non-volatile memory (i.e. memory that retains data when power is lost) such as a disk. For example, one or more disks of a data bank may have portions dedicated to write cache. As these write caches may, in some embodiments, be essentially circular buffers, it may take on average one half a revolution of the disk in order to be able to place a received WRITE command into a write cache on the disk. Thus, the latency between the time a WRITE command is received, and when the WRITE command can be placed in the write cache and a response returned to the host that issued the WRITE command generated may be on the order of milliseconds or more.

As there may be many hosts 102 or applications on these hosts 102 and many WRITE commands may be issued by those hosts 102 or applications, it is desired to reduce this latency and the commensurate time a host 102 or application waits between issuing a WRITE command and receiving a response to that WRITE command and, commensurately, the time between when a host 102 or application may issue a WRITE command when the host 102 or application may resume processing or other operations.

Accordingly, in certain embodiments, a high speed memory may be utilized to store the write cache on each data bank. By storing the write cache of a data bank on a high speed memory the performance and speed of such a high speed memory can be utilized to reduce the latency associated with responding to a WRITE command. While it may be possible to utilize such high speed memories to implement all the storage (e.g., data store 250, memory 230, etc.), such high speed memories may be quite expensive. Thus, in some embodiments by retaining the use of lower speed memory to implement at least some storage besides that need for the write cache, the speed and performance of high speed memory may be obtained with respect to responding to WRITE commands received from hosts 102 and the latency of such responses reduced while the advantages of lower cost are realized by using lower speed/lower cost storage for other aspects of a data bank.

Figure 11A:
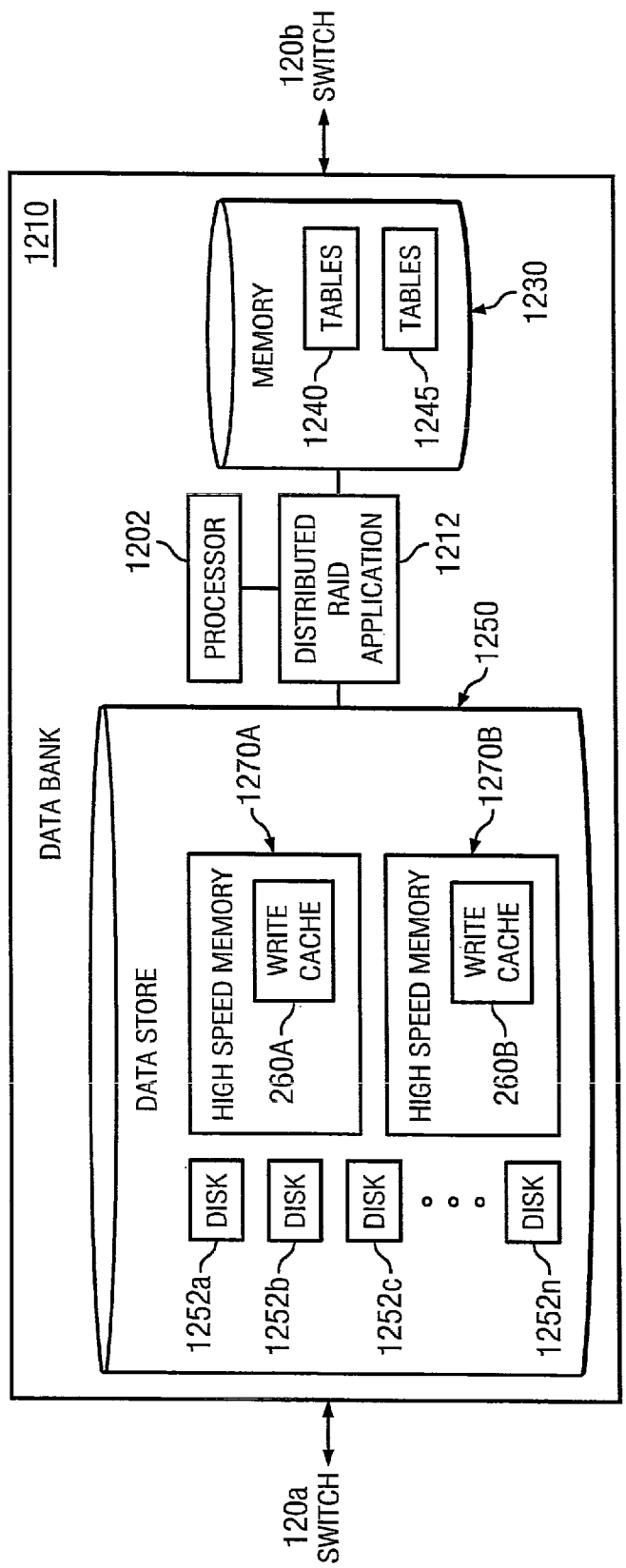
FIG. 11A is a block diagram of one embodiment of a data bank.

FIG. 11A depicts a block diagram of one embodiment of a data bank 1210 computer operable to implement distributed RAID. Here, data bank 1210 comprises a data store 1250, and a processor 1202 operable to execute instructions stored on a computer readable medium, where the instructions are operable to implement distributed RAID application 1212. Distributed RAID application 1212 may periodically issue heartbeat communications to distributed RAID applications 1212 on other data banks 1210 to determine if there has been a fault with respect to that data bank 1210. If the distributed RAID application 1212 determines that another data bank 1210 is experiencing a fault it may set one or more fault flags corresponding to that data bank 1210. Using these fault flags for each distributed RAID application 1212 on each data bank 1210 a particular distributed RAID application 1212 may determine if a certain data bank 1210 is faulty.

Distributed RAID application 1212 may also have access (for example, to read, write, issue commands, etc.) to data store 1250 comprising one or more storage media, which may for example be disks 1252 operating according to almost any protocol known, such as SATA, PATA, FC, etc. where each of the disks 252 may, or may not, be of equal size. Distributed RAID application 1212, executing on each of data banks 1210 can allow the allocation of and use of volumes using data stores 1250 across data banks 1210 and the implementation of RAID in conjunction with these volumes utilizing a set of global tables 1240 shared between data banks 1210, a set of local tables 1245 and a write cache 1260. The set of global tables 1240 and set of local tables 1245 may be stored in a memory 1230 (which may be in data store 1250 or may be another memory altogether).

Data store 1250 may also comprise high speed memory 1270. Write cache 1260 may be stored on a high speed memory 1270 in data bank 1210. This high speed memory 1270 may be almost any storage media that has a faster average access time than a disk 1252 in the data store 1250 or the storage media comprising memory 1230. For example, in one embodiment, high speed memory 1270 may be a solid state drive (SSD). While both a single level cell (SLC) or multiple level cell (MLC) SSDs may be utilized, in order to increase the mean time between failures of the high speed memory 1270 or otherwise increase reliability or durability, in one embodiment high speed memory 1270 may be a SLC SSD. In one particular embodiment, these high speed memories 1270 may have around a 25 GB capacity each. It will be noted that while in the depicted embodiment two high speed memories 1270 are present, and write cache 1260 is stored on both high speed memories 1270, the use of two high speed memories 1270 and the redundant storage of the write cache 1260 may be implemented in one embodiment for the purpose of increased fault tolerance and that other embodiments of a data bank may utilize more or fewer high speed memories 1270 as desired.

Figure 11B:
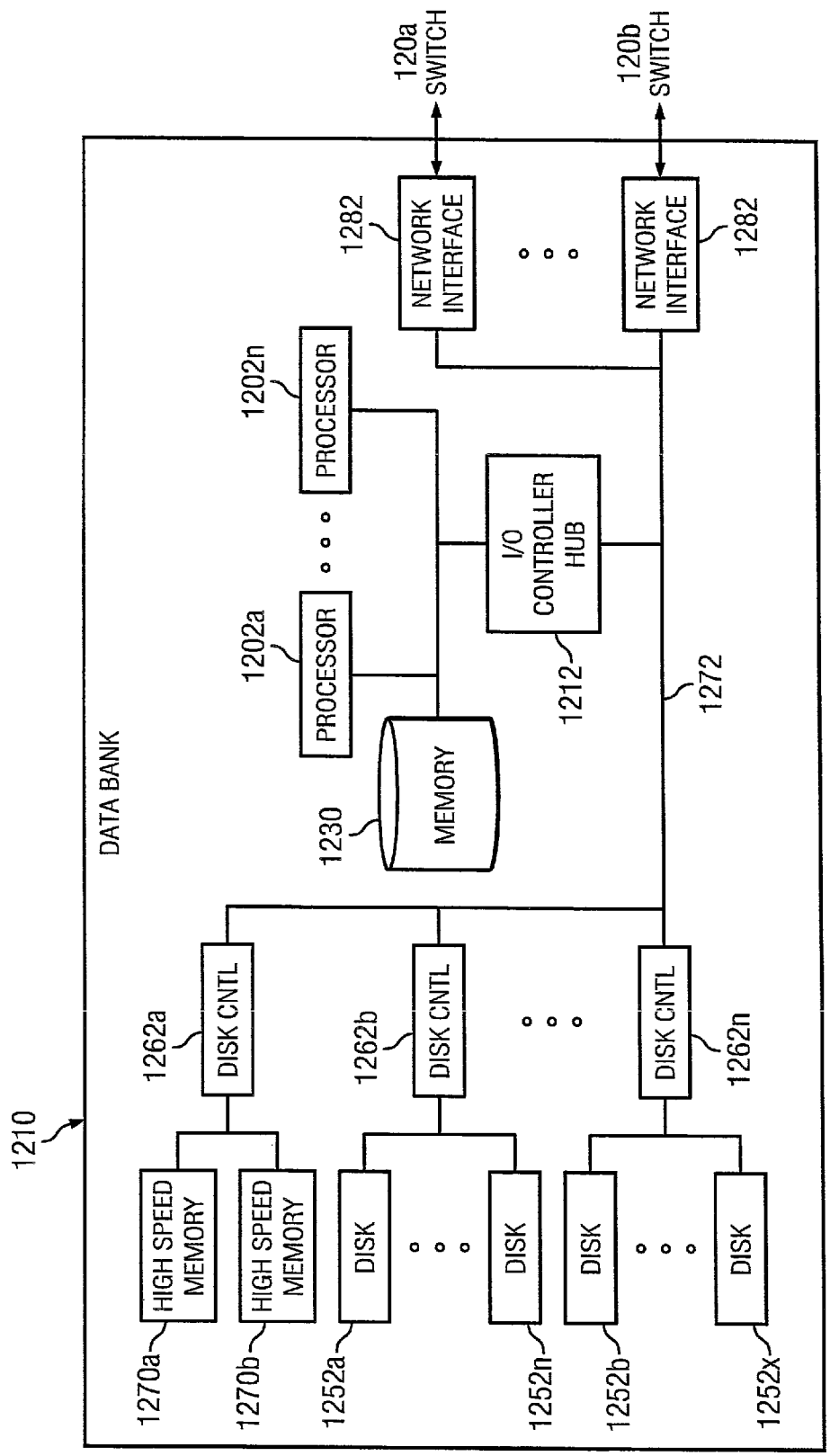
FIG. 11B is a block diagram of one embodiment of an architecture for a data bank.

FIG. 11B depicts a block diagram of one embodiment of a hardware architecture which may be used to implement data bank 1210 computer operable to implement distributed RAID. In this architectural example, data bank 1210 comprises one or more processors 1202 which may adhere to the Intel x86 architecture or some other architecture altogether and a memory 1230 coupled through a bus to I/O controller hub 212, which in one embodiment may be a southbridge chip or the like. The I/O controller hub 1212 may, in turn, be coupled to and control a bus 1272 such as a PCI-X bus, PCI-express bus, etc. Coupled to this bus 1272 are one or more disk controllers 1262 such as, for example, an LSI 1068 SATA/SAS controller. Each of these disk controllers 1262 is coupled to a high speed memory 1270 or one or more disks 1252, where collectively these high speed memories 1270 and disks 1252 may comprise data store 1250. Additionally, one or more network interfaces 1282 may also be coupled to bus 1272. These network interfaces 1282 may be network interfaces (such as Ethernet, etc.) which are included on motherboards, may comprise one or more network interface cards configured to interface via one or more protocols such as Ethernet, fibre channel, etc. or may be some other type of network interface such that data bank 1210 may communicate with switches 120 through these network interfaces 1282.

It should be noted here, that in operation, data bank 1210 functions in substantially the same manner as described above with respect to data bank 110 and may thus be utilized in an architecture substantially similar to that depicted in FIG. 1. Accordingly, when data bank 1210 receives a WRITE command, the WRITE command may be placed in the write cache 1260 stored on the high speed memory 1270. In one embodiment, to further ensure the durability of the high speed memory 1270 and to reduce latency even further in some cases where the high speed memory is an SSD, writes to the high speed memory 1270 may be made sequentially.

Once the WRITE command is placed in the write cache 1260, a response to the WRITE command may generated. By storing the write cache 1260 on a high speed memory 1270 the latency between when a WRITE command is received and when a response to that WRITE command is generated may be significantly reduced. Thus, the performance of the entire implementation of distributed RAID may be significantly improved; in some instances up to a ten times greater performance improvement (or more) may be realized.

This improved performance may be understood better when considered with reference to hosts 102. To each host 102 it appears as if an issued WRITE command has been handled in the time needed to communicate the WRITE command to data bank 1210, place the WRITE command in the write cache 1260 in high speed memory 1270, generate a response to the WRITE command and communicate the response to the WRITE command. Thus, use of high speed memory 1270 may reduce the time (relative to storing the write cache on a lower speed memory) from the issuing of a WRITE command until the host 102 receives a response to that WRITE command. Importantly, however, the cost benefits of using other less expensive (relative to high speed memory 1270) types of memory in data store 1250 or memory 1230 may still be obtained while achieving the performance benefits offered through the placement of write cache 1260 in high speed memory 1270, as any actual WRITE commands in write cache 1260 may be processed after a response to the WRITE command has been generated. Thus, the speed at which the actual WRITE command is processed with respect to data in data store 1250 has substantially no bearing on the speed at which a response to the received WRITE command may be generated.

The effective use of such high speed memories 1270 may present various challenges in certain environments. One of these environments is when the data banks are used to execute applications other than the distributed RAID application as discussed in U.S. patent application Ser. No. 12/490,810, entitled "Method and System for Execution of Applications in Conjunction with Distributed RAID," filed Jun. 24, 2009, hereby incorporated by reference for all purposes. Specifically, in some embodiments, components of computing devices which are used to implement data banks may have more (or may be built to have more) computing power than may be needed to execute the distributed RAID application. In many cases, then the computing device (for example, processor, cache, memory, boards, etc.) used to implement a data bank may have unutilized computing power when used to execute only the distributed RAID application. What is desired, then, is to utilize this excess computing power to execute applications which may otherwise execute on host 102 and utilize a distributed RAID application. This may be problematic, however, as in many cases there may be a wide variety of these applications executing on different hosts 102, where each of the hosts may execute differing operating systems, the application may be configured to execute on only one type of operating system, etc.

Therefore, embodiments may allow various applications which may utilize a distributed RAID system (or other types of applications) to be executed on the same set of computing devices which implement that distributed RAID system. To allow the distributed RAID application to be executed in conjunction with other applications on the same set of computing devices a virtualization layer may be executed on a data bank. A set of desired application programs may be executed using this virtualization layer, where the context for each instance of the application executing on the virtualization layer may be stored in a volume kept utilizing the distributed RAID system. These virtual machines (for example, application and any applicable contextual information stored in the volume) may then be executed in conjunction with the virtualization layer on any one of the data banks.

By executing these applications in conjunction with the computing devices which implement the distributed RAID system a number of advantages may be achieved. First and foremost, a consolidation of physical resources may be achieved, reducing costs associated with both physical resources and the resources required to install, configure, utilize and maintain such resource as less space, power, cooling, spares, etc. may be needed. Furthermore, greater speed may be achieved in the implementation of both application and a distributed RAID system as communications occurring in conjunction with the use of the applications and the distributed RAID system may be fewer or may occur more quickly.

Additionally, levels of fault tolerance may be introduced through a configuration where instances of the application are saved as virtual machines and executed on a virtualization layer on a data bank implementing a distributed RAID system, as will be apparent in more detail after reviewing the remainder of the application. In brief, this level of fault tolerance may result from the fact that each virtual machine (for example, instance of executing application which may be executed on a virtualization layer) is stored in a volume of the distributed RAID system may mean that the virtual machine may be recovered in the case of the failure of one of the data banks. Additionally, fault tolerance may be introduced as the virtual machine may be executed on the virtualization layer of any data bank, thus even if a single data bank fails each virtual machine may still be executed.

Figure 12:
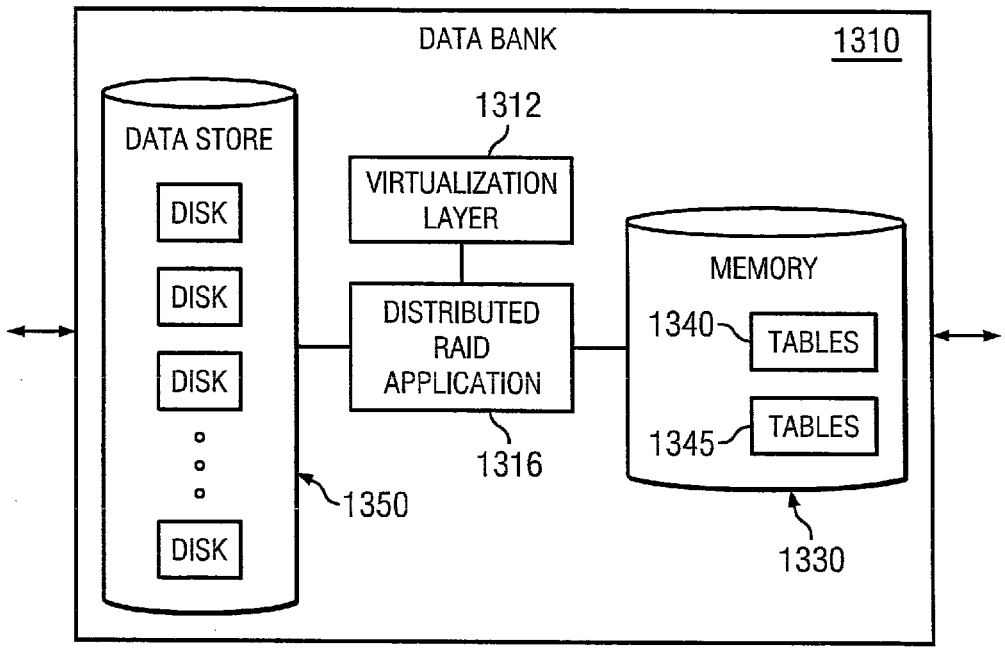
FIG. 12 is a block diagram of one embodiment of a data bank.

With reference now to FIG. 12, one embodiment of a data bank which may implement a distributed RAID system and allow execution of various applications is depicted. Here, data bank 1310 comprises a data store 1350, and a processor (not shown) or other hardware operable to execute instructions stored on a computer readable medium. This hardware may, for example, be an x86 platform or the like.

Instructions stored on a computer readable medium may be operable to implement virtualization layer 1312 and distributed RAID application 1316. Virtualization layer 1312 may be one of, for example, Containers by Sun Microsystems, Linux KVM, Linux VServer, Oracle VM, Virtual PC, Virtual Server by Microsoft, PowerVM by IBM Logical Domains by Sun Microsystems, VMware Server, etc. or any other type of virtualization or emulation machine application, as are known in the art. Distributed RAID application 1316 may have functionality similar to that described above. To aid in the implementation of one or more of these, tables 1340, 1345 in memory 1330 may track such information as which volumes stored by the distributed RAID system are virtual machines and which data bank 1310 is assigned to a particular virtual machine.

Figure 13A:
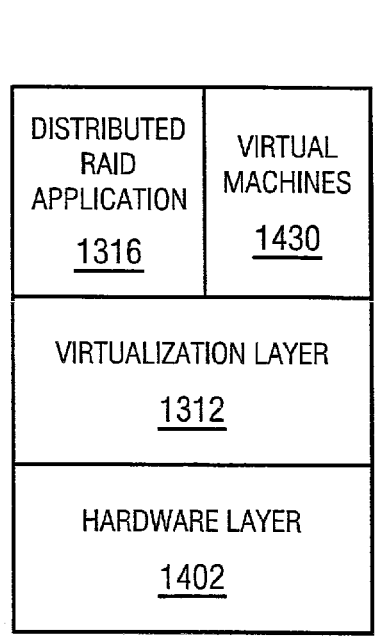
FIG. 13A is block diagram of an example of one embodiment of an architecture for a data bank.
Figure 13B:
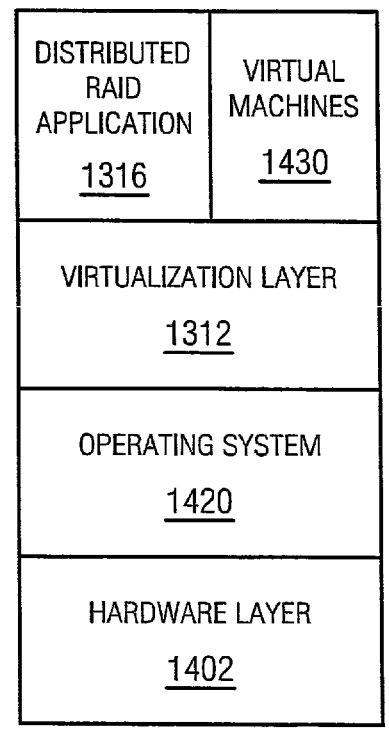
FIG. 13B is block diagram of an example of one embodiment of an architecture for a data bank.
Figure 13C:
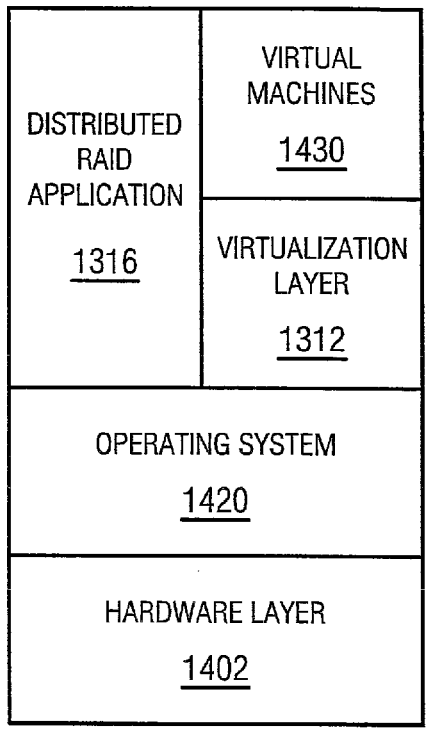
FIG. 13C is block diagram of an example of one embodiment of an architecture for a data bank.

Briefly referring to FIGS. 13A, 13B and 13C then, three embodiments of architectures of data bank 1310 with virtualization layers are depicted. It will be noted that other embodiments of such architectures are possible and may be utilized. In FIG. 13A, virtualization layer 1412 may exist on hardware layer 1402 such that distributed RAID application 1316 and virtual machines 1430 (applications and their corresponding contexts) may be executed on virtualization layer 1312. FIG. 13B depicts an embodiment where an operating system 1420 (for example, Windows, Solaris, MacOS, etc.) may execute on hardware layer 1402 with virtualization layer 1312 executing on the operating systems 1420 such that distributed RAID application 1316 and virtual machines 4130 (applications and their corresponding contexts) may be executed on virtualization layer 1312. FIG. 13C depicts an embodiment in which an operating system 1420 may execute on hardware layer 1402. Distributed RAID application 1316 and a virtualization layer 1312 may execute on the operating system 1420. Virtual machines 1430 may then be executed on virtualization layer 1312.

As discussed above, the use of a high speed memory to store the write cache on a data bank may significantly increase the performance of a distributed RAID system. Thus, it may be desired to utilize such a high speed memory in data banks which implement a virtualization layer. The use of a virtualization layer may, however, hamper the efficacy of such high speed memory. This situation arises mainly due to the design of most virtualization layers. In many cases, the virtualization layer controls access to the hardware of the machine on which it operates. As a result of this design disk controllers, devices on the bus or other hardware of the machine must, in most cases, be accessed through the virtualization layer. Latency is thus introduced proportionally to the overhead imposed by the virtualization layer in managing the requested hardware, processing requests received from a virtual machine executing on the virtualization layer, accessing a hardware device and responding to such requests, etc. This overhead introduced through implementation of a virtualization layer on a data bank may decrease by half (or more) the performance gains realized from the use of high speed memory to store the write cache. It is therefore desired to implement a virtualization layer on embodiments of data banks that utilize high speed memory to store a write cache while substantially reducing or eliminating the performance penalty imposed by such virtualization layers with at least with respect to accessing the high speed memory of a data bank.

Certain processors and chipsets may offer the ability to isolate I/O resources. For example, certain Intel processors and chipsets may employ Virtualization Technology (VT) and certain of these processors and chipsets may further employ directed I/O (d). These VT-d processors and chipsets (collectively chipsets), support supports the remapping of I/O DMA transfers and device-generated interrupts. The architecture of VT-d provides the flexibility to support multiple usage models that may run un-modified, special-purpose, or "virtualization aware" guest OSs. Specifically, VT-d may enable the direct assignment of devices to virtualized machines running on a virtualization layer.

Furthermore, certain virtualization layers allow configurations where the virtualization layer is configured to relinquish control of certain hardware. Examples of such virtualization layers are those offered by VMware Inc. of Palo Alto, Calif. Thus, such virtualization layers may be configured such that they do not own particular hardware.

Accordingly, embodiments of data banks may utilize the capabilities of the chipsets comprising the data bank and the virtualization layer executing on the data bank to substantially decrease the latency imposed by use of a virtualization layer. More specifically, in certain embodiments, the virtualization layer may be configured such that it does not control access to the high speed memory of the data bank. Additionally, access to the high speed memory may be managed by the distributed RAID application executing on the data bank. In this manner, latency imposed by the virtualization layer may be substantially reduced with respect to accesses to the high speed memory and the advantages of storing the write cache on such high speed memory obtained.

Figure 14A:
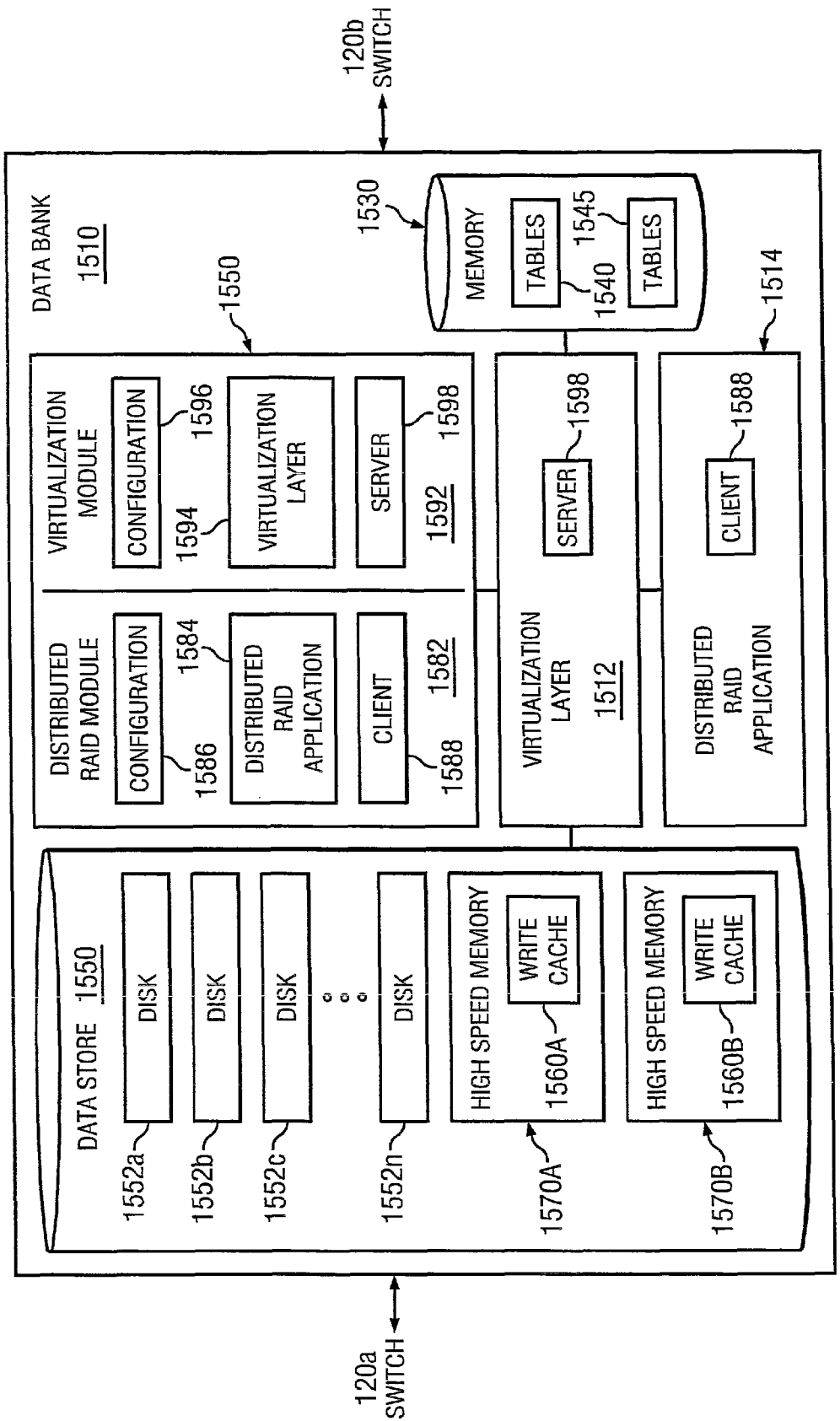
FIG. 14A is block diagram of an example of one embodiment of an architecture for a data bank.

One embodiment of a data bank which may implement a distributed RAID system and allow execution of various applications is depicted in FIG. 14A. Here, data bank 1510 comprises a data store 1550, and a processor (not shown) operable to execute instructions stored on a computer readable medium. Data store 1550 may comprise one or more storage media, which may for example be disks 1552 operating according to almost any protocol known, such as SATA, PATA, FC, etc. where each of the disks 1552 may, or may not, be of equal size. Data store 1550 may also comprise high speed memory 1570. Write cache 1560 may be stored on a high speed memory 1570 in data bank 1510 as discussed above.

Storage media 1580, which may be for example, a flash memory of 16 GB or the like, may comprise a distributed RAID module 1582 and a virtualization module 1592 stored thereon. These modules 1582, 1592 may for example be stored on the storage media 1580 during a manufacturing, testing or burn-in procedure implemented by a manufacturer, distributor, supplier or other entity involved with the provisioning of the components of the data bank 1510 or the data bank 1510 itself. It will also be noted that certain portions of these modules 1582, 1592 may also be accessed or changed during the operation of the data bank 1510.

The virtualization module 1592 may comprise computer readable instructions operable to implement virtualization layer 1512. In one embodiment, Virtualization layer 1592 may be a virtualization or emulation machine application that allows for hardware on a computing device on which it is executing to be assigned to, or managed by, a virtual machine executing on the virtualization layer 1512, including for example, VMware ESX. Virtualization module 1592 may also include a virtualization configuration file 1596 and a server application module 1598, such that when the virtualization layer 1594 is started it is configured according the virtualization configuration file 1596 and executes server 1598. The virtualization configuration file 1596 for the virtualization layer 1594 may comprise one or more virtual machines that are to be executed on the virtualization layer. These virtual machines may be identified by their corresponding location on a storage media (either an actual storage media or a virtual storage media). Thus, when the data bank 1510 is configured at the manufacturer, distributor, supplier or other entity the virtualization configuration file may include the location on the storage media of the distributed RAID module 1582. As the virtualization layer operates, and other virtual machines are defined (e.g. by users of the data bank 1510), the location of these virtual machines may be added to the virtualization configuration file. Accordingly, as depicted virtualization layer 1512 is an executing instance of virtualization layer 1594 configured according to virtualization configuration file 1596 and executing server application 1598.

Similarly, distributed RAID module 1582 may comprise computer readable instructions operable to implement distributed RAID application 1514. In one embodiment, distributed RAID module 1592 may include distributed RAID application 1584, a distributed RAID configuration file 1586 and a client application 1588 packaged as a virtual machine configured to execute on a virtualization layer, such that when the distributed RAID application 1584 is started by a virtualization layer it is configured according the configuration file 1586 and is executing client 1588. Accordingly, distributed RAID application 1514 is an instance of distributed RAID application 1584 executing as a virtual machine on virtualization layer 1512, configured according to distributed RAID configuration file 1586 and executing client application 1588.

Distributed RAID application 1514 may have substantially similar functionality as that described above. In addition, in this embodiment, as a result of the configuration of virtualization layer 1512 and distributed RAID application 1514, distributed RAID application 1514 may be assigned hardware used to access at least portions of data store 1550. Thus, access to at least portions of storage media in data store 1550, including high speed memory 1570 is controlled by distributed RAID application 1514, not virtualization layer 1512. Accordingly, if access to these portions of data store 1550 is necessitated by commands issued by any executing virtual machines, this access may be carried out directly by distributed RAID application 1514 without requesting such access from virtualization layer 1512.

By configuring the distributed RAID application 1514 and virtualization layer 1512 such that the distributed RAID application 1514 controls access to portions of the storage media of data store 1550, latency with respect to access of this storage media may be reduced. As discussed above this reduction is particularly germane with respect to access to high speed memory 1570 storing write cache 1560. When data bank 1510 receives a WRITE command, the WRITE command may be placed in the write cache 1560 stored on the high speed memory 1570 substantially without involvement of the virtualization layer 1512.

Once the WRITE command is placed in the write cache 1560, a response to the WRITE command may generated. By substantially eliminating the latency introduced by the virtualization layer involved with storing to the write cache 1560 on a high speed memory 1570 the latency between when a WRITE command is received at the distributed RAID application 1514 and when a response to that WRITE command is generated may be significantly reduced. Thus, the performance of the entire implementation of distributed RAID may be significantly improved.

Figure 14B:
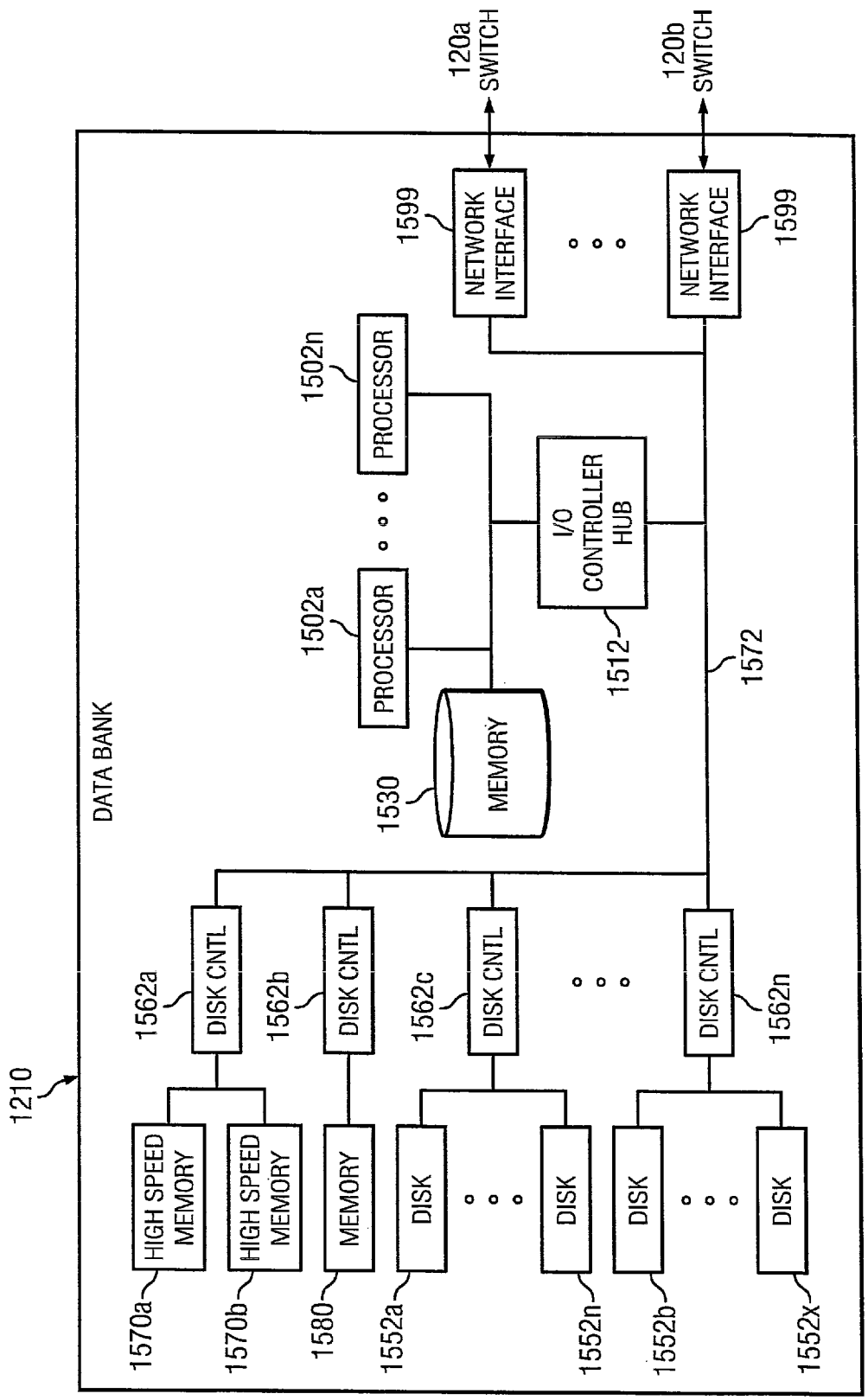
FIG. 14B is block diagram of an example of one embodiment of an architecture for a data bank.

FIG. 14B depicts a block diagram of one embodiment of a hardware architecture which may be used to implement data bank 1510 computer operable to implement distributed RAID and a virtualization layer. In this architectural example, data bank 1510 comprises one or more processors 1502 which may adhere to the Intel x86 architecture or some other architecture altogether and a memory 1530 coupled through a bus to I/O controller hub 212, which in one embodiment may be a southbridge chip or the like. The processor(s) 1502 and I/O controller hub 1512 may comprise a chipset that has Intel VT-d capabilities or another type of chipset with similar capabilities to assign hardware to a particular virtual machine or executing process.

The I/O controller hub 1512 may, in turn, be coupled to and control a bus 1572 such as a PCI-X bus, PCI-express bus, etc. Coupled to this bus 1572 are one or more disk controllers 1562 such as, for example, an LSI 1068 SATA/SAS controller. Each of these disk controllers 1562 is coupled to a high speed memory 1570, memory 1580 containing the distributed RAID module and virtualization layer module, or one or more disks 1552, where collectively these high speed memories 1270, memory 1280 and disks 1552 may comprise data store 1550. Additionally, one or more network interfaces 1599 may also be coupled to bus 1572. These network interfaces 1599 may be network interfaces (such as Ethernet, etc.) which are included on motherboards, may comprise one or more network interface cards configured to interface via one or more protocols such as Ethernet, fibre channel, etc. or may be some other type of network interface such that data bank 1510 may communicate with switches 120 through these network interfaces 1599.

Figure 15:
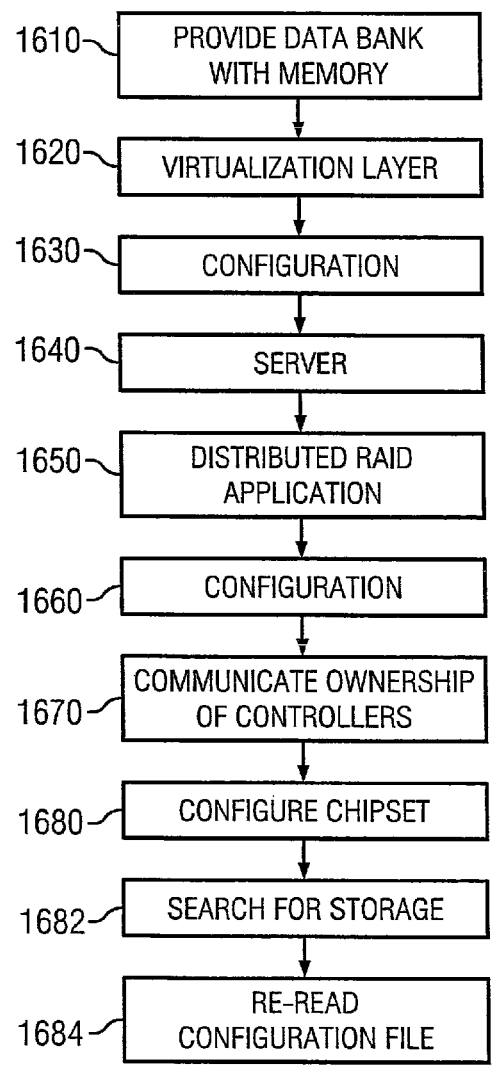
FIG. 15 is a flow diagram for one embodiment of configuring a data bank.

FIG. 15 depicts one embodiment of a method for configuring a data bank such as that depicted in FIGS. 14A and 14B such that a distributed RAID application may execute on a virtualization layer, various applications may execute as virtual machines on the virtualization layer and the distributed RAID application may control access to the data store of the data bank. Initially at step 1610 the data bank may be equipped with a memory that includes a distributed RAID module and a virtualization module as described above. These modules may for example be stored on a storage media during a manufacturing, testing or burn-in procedure implemented by a manufacturer, distributor, supplier or other entity involved with the provisioning of the components of the data bank 1210 or the production of the data bank itself.

When the data bank is booted, power to the data bank is cycled or the data bank is otherwise reset, the data bank may be configured to access the virtualization module stored on a memory in the data bank. At step 1620 then the virtualization layer of the virtualization module may be executed by the data bank. The execution of the virtualization layer may include the configuration of the virtualization layer according to the virtualization configuration file of the virtualization module at step 1630. This virtualization configuration file when read by the virtualization layer may configure the virtualization layer such that the virtualization layer does not control any of the disk controllers of the data bank except the disk controller through which access to the memory comprising the virtualization module is made.

More specifically, in one embodiment, the disk controllers of the data bank may be PCI-express devices. Thus, the virtualization layer can be configured such that it does not control the PCI-express devices (e.g. identified by Bus, Device and Function (BDF) number) corresponding to all disk controllers except the disk controller through which access to the memory comprising the virtualization module is made. Furthermore, at step 1640 the server application of the virtualization module may be started on the virtualization layer.

The virtualization configuration file may also instruct the virtualization layer to execute the distributed RAID application of the distributed RAID module. Thus, at step 1650 the distributed RAID application may be executed by the virtualization layer. The execution of the distributed RAID application may include the configuration of the distributed RAID application according to the configuration file of the distributed RAID module at step 1660. This distributed RAID configuration file, when read by the distributed RAID application, may configure the distributed RAID application such that it controls all of the disk controllers of the data bank except the one attached to the memory comprising the virtualization module. Additionally, the distributed RAID configuration file may instruct the distributed RAID application to communicate to the virtualization layer that the distributed RAID application controls these disk controllers. Accordingly, at step 1670 the distributed RAID application may communicate its ownership of the disk controllers to the virtualization layer. The virtualization layer may then, at step 1680, configure the chipset (e.g. processor I/O controller hub) to give the distributed RAID application control over the disk controllers.

As discussed above the virtualization configuration file may contain the location of the distributed RAID module and virtual machines to be executed on the virtualization layer. However, when the virtualization configuration file is initially read by the virtualization layer, only the location of the distributed RAID module may be accessible by the virtualization layer (as the distributed RAID application is not yet running and the virtualization application has only been configured to utilize the disk controller on which the memory comprising the virtualization module resides). Thus, the virtualization layer may have failed to start the execution of one or more virtual machines whose location is specified in the virtualization configuration file, as the specified location(s) in the virtualization configuration file may be unavailable or inaccessible to the virtualization layer.

Once the distributed RAID application is executing on the virtualization layer, the client on the distributed RAID application may, at step 1682, contact the server on the virtualization layer and instruct the server to direct the virtualization layer to search for available storage (e.g. actual or virtual storage). The virtualization layer may then locate any newly available storage and update its list of available storage based on the storage found (for example, it may attempt to mount such storage such that the storage becomes part of its list of mounted storage, etc.).

While the virtualization layer may now be aware that other storage (e.g. actual or virtual storage) is available, in most cases the virtualization layer will not attempt to start the virtual machine(s) whose location(s) are specified in the virtualization configuration file. To prod the virtualization layer to re-read the virtualization configuration file, the client on the distributed RAID application may, at step 1684, instruct the server application on the virtualization layer to re-read the virtualization configuration file. The server on the virtualization layer directs the virtualization layer to read the virtualization configuration file. Thus, when the virtualization configuration file is read by the virtualization layer if the location(s) of any virtual machine(s) specified in the virtualization configuration file is available to the virtualization layer, the virtual machine(s) may be accessed and the execution of these virtual machine(s) on the virtualization layer started.

In the foregoing specification, the invention has been described with reference to specific embodiments. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of invention.

Benefits, other advantages, and solutions to problems have been described above with regard to specific embodiments. However, the benefits, advantages, solutions to problems, and any component(s) that may cause any benefit, advantage, or solution to occur or become more pronounced are not to be construed as a critical, required, or essential feature or component of any or all the claims.

What is claimed is:

1. A system for implementing distributed Redundant Array of Independent Disks (RAID), comprising: a plurality of data bank computers, each data bank coupled to each of one or more hosts and each of the other plurality of data banks, each data bank including:
    a processor;
    a data store;
    a high speed memory;
    a computer readable medium comprising first instructions for a distributed RAID application, the first instructions executable to:
    receive a command corresponding to a first segment of a volume from a first host of the one or more hosts, wherein the volume and redundancy data corresponding to a RAID level implemented in conjunction with the volume are stored on each of the plurality of data banks according to a data bank order where the data bank order is a permutation of the plurality of data banks, such that for each segment of the volume a corresponding redundancy segment comprising the redundancy data associated with that segment does not reside on the same data bank as the segment;
    determine if the command is a write command and if the command is a write command storing the write command in a write cache on the high speed memory;
    determine a first data bank of the plurality of data banks, wherein the first data bank corresponds to the first segment; and
    if the first data bank is the data bank which received the command, execute the command with respect to the first segment and if not, forward the command to the first data bank.

2. The system of claim 1, wherein the high speed memory is part of the data store.

3. The system of claim 1, wherein the first instructions are further executable to send a response to the first host after the write command is stored in the write cache.

4. The system of claim 3, wherein the response to the first host is sent before the determination of the first data bank, execution of the command or forwarding of the command.

5. The system of claim 1, wherein the computer readable medium comprises second instructions executable to implement a virtualization layer, wherein the distributed RAID application executes on the virtualization layer.

6. The system of claim 5, wherein the system further comprises a disk controller coupled to the high speed memory and used to control access to the high speed memory.

7. The system of claim 6, wherein the disk controller is controlled by the distributed RAID application.

8. A method for implementing a distributed Redundant Array of Independent Disks (RAID) application on one or more data bank computers, each data bank computer comprising a processor, a data store and a high speed memory and each data bank coupled to one or more hosts and each of the other plurality of data banks, comprising:
    receiving a command corresponding to a first segment of a volume from a host, wherein the volume and redundancy data corresponding to a RAID level implemented in conjunction with the volume are stored on each of a plurality of data banks according to a data bank order where the data bank order is a permutation of the plurality of data banks, such that for each segment of the volume a corresponding redundancy segment comprising the redundancy data associated with that segment does not reside on the same data bank as the segment;
    determining if the command is a write command and if the command is a write command storing the write command in a write cache on the high speed memory;
    determining a first data bank of the plurality of data banks, wherein the first data bank corresponds to the first segment;
    executing the first command with respect to the first segment, wherein the command is executed on the first data bank.

9. The method of claim 8, wherein the high speed memory is part of the data store.

10. The method of claim 8, further comprising sending a response to the first host after the write command is stored in the write cache.

11. The method of claim 10, wherein the response to the first host is sent before the determination of the first data bank, execution of the command or forwarding of the command.

12. The method of claim 8, further comprising executing a virtualization layer, wherein the distributed RAID application executes on the virtualization layer.

13. The method of claim 12, wherein the method utilizing a disk controller coupled to the high speed memory to control access to the high speed memory.

14. The method of claim 13, wherein the disk controller is controlled by the distributed RAID application.

15. A non-transitory computer readable medium comprising computer executable instructions for implementing a distributed Redundant Array of Independent Disks (RAID) application on one or more data bank computers, each data bank computer comprising a processor, a data store and a high speed memory and each data bank coupled to one or more hosts and each of the other plurality of data banks, the computer instructions executable for:

receiving a command corresponding to a first segment of a volume from a host, wherein the volume and redundancy data corresponding to a RAID level implemented in conjunction with the volume are stored on each of a plurality of data banks according to a data bank order where the data bank order is a permutation of the plurality of data banks, such that for each segment of the volume a corresponding redundancy segment comprising the redundancy data associated with that segment does not reside on the same data bank as the segment;

determining if the command is a write command and if the command is a write command storing the write command in a write cache on the high speed memory;

determining a first data bank of the plurality of data banks, wherein the first data bank corresponds to the first segment;

executing the command with respect to the first segment, wherein the first command is executed on the first data bank.

16. The computer readable medium of claim 15, wherein the high speed memory is part of the data store.

17. The computer readable medium of claim 15, further comprising sending a response to the first host after the write command is stored in the write cache.

18. The computer readable medium of claim 17, wherein the response to the first host is sent before the determination of the first data bank, execution of the command or forwarding of the command.

19. The computer readable medium of claim 15, further comprising executing a virtualization layer, wherein the distributed RAID application executes on the virtualization layer.

20. The computer readable medium of claim 19, wherein the method utilizing a disk controller coupled to the high speed memory to control access to the high speed memory.

21. The computer readable medium of claim 20, wherein the disk controller is controlled by the distributed RAID application.

* * * * *